US012678849B2

(12) United States Patent
Diamond et al.

(10) Patent No.: US 12,678,849 B2
(45) Date of Patent: Jul. 14, 2026

(54) ALUMINUM CUP

(71) Applicant: LumiTerra, Inc., Beverly Hills, CA (US)

(72) Inventors: Kevin Diamond, Los Angeles, CA (US); Paul Kradin, Solvang, CA (US); Sandro Mizzon, Sabaudia (IT); Steve Bauerfeind, Solvang, CA (US); Sam Ristich, Los Angeles, CA (US)

(73) Assignee: LumiTerra, Inc., Beverly Hills, CA (US)

( * ) Notice: Subject to any disclaimer, the term of this patent is extended or adjusted under 35 U.S.C. 154(b) by 0 days.

(21) Appl. No.: 19/076,986

(22) Filed: Mar. 11, 2025

(65) Prior Publication Data

US 2025/0289206 A1     Sep. 18, 2025

Related U.S. Application Data

(60) Provisional application No. 63/564,493, filed on Mar. 12, 2024.

(51) Int. Cl.
B32B 15/085     (2006.01)
B21D 22/28     (2006.01)
(Continued)

(52) U.S. Cl.
CPC .............. B21D 22/28 (2013.01); B32B 15/08 (2013.01); B32B 15/085 (2013.01); B32B 15/09 (2013.01);
(Continued)

(58) Field of Classification Search
CPC ........... B32B 1/02; B32B 15/00; B32B 15/08; B32B 1/00; B32B 15/085; B32B 15/09;

B32B 15/20; B32B 2250/03; B32B 2250/40; B32B 2307/31; B32B 2307/7376; B32B 2311/24; B32B 2323/046;
(Continued)

(56) References Cited

U.S. PATENT DOCUMENTS 5,100,708 A * 3/1992 Heyes ..................... B32B 27/36
428/458
2012/0318805 A1 12/2012 Leser et al.
(Continued)

FOREIGN PATENT DOCUMENTS

CN     101531260 B     1/2011
CN     107108065 A     8/2017
(Continued)

OTHER PUBLICATIONS

International Search Report and Written Opinion for related International Application No. PCT/US2025/019434, mailed Jun. 27, 2025, 18 page.

*Primary Examiner* — Yan Lan
(74) *Attorney, Agent, or Firm* — Morgan, Lewis & Bockius LLP

(57)     ABSTRACT

The various embodiments described herein include aluminum cups and method and materials to form aluminum cups. In one aspect, an aluminum cup includes a cup side wall including an aluminum foil layer, a first polymer layer, and a second polymer layer. The first perpendicular edge of the cup side wall can be heat-bonded to the second perpendicular edge of the cup side wall, bonding the first polymer layer to the second polymer layer.

26 Claims, 21 Drawing Sheets

(51) Int. Cl.
    *B32B 15/08*        (2006.01)
    *B32B 15/09*        (2006.01)
    *B32B 15/20*        (2006.01)
    *B65D 8/00*        (2006.01)

(52) U.S. Cl.
    CPC .............. *B32B 15/20* (2013.01); *B65D 15/10*
    (2013.01); *B65D 15/16* (2013.01); *B32B*
    *2250/03* (2013.01); *B32B 2250/40* (2013.01);
    *B32B 2307/31* (2013.01); *B32B 2307/7376*
    (2023.05); *B32B 2311/24* (2013.01); *B32B*
    *2323/046* (2013.01); *B32B 2323/10* (2013.01);
    *B32B 2367/00* (2013.01); *B32B 2439/02*
    (2013.01)

(58) Field of Classification Search
    CPC ........... B32B 2323/10; B32B 2367/00; B32B
    2439/02; B32B 27/08; B32B 27/32; B32B
    27/36; B32B 3/04; B32B 3/28; B32B
    3/30; B32B 7/12; Y10T 428/1352; B65D
    88/00; B65D 15/10; B65D 15/16; B21D
    22/28; B21D 33/00; B21D 51/2623;
    B21D 51/2653
    See application file for complete search history.

(56) References Cited

U.S. PATENT DOCUMENTS

| | | | |
|---|---|---|---|
| 2018/0221936 A1* | 8/2018 | Scott ...................... | B21D 51/10 |
| 2020/0199420 A1* | 6/2020 | Lutz ........................ | C08L 27/04 |
| 2020/0232164 A1* | 7/2020 | Parker ................... | D21H 19/24 |
| 2020/0361196 A1* | 11/2020 | Meizanis ......... | C09D 123/0876 |

FOREIGN PATENT DOCUMENTS

| | | |
|---|---|---|
| CN | 112998502 B | 1/2024 |
| JP | 2009-166078 A | 7/2009 |
| WO | WO-2023047737 A1 * | 3/2023 |

* cited by examiner

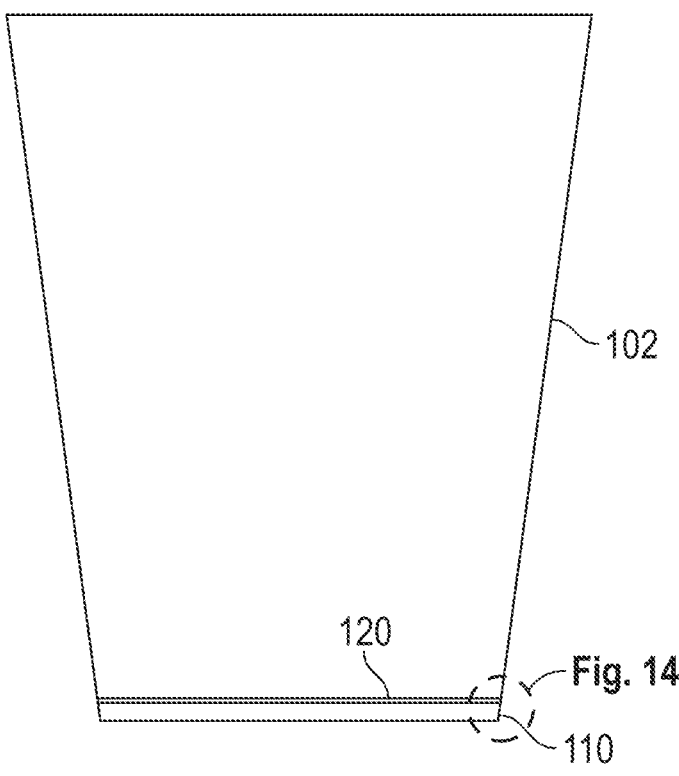
102
120
Fig. 14
110
FIG. 13
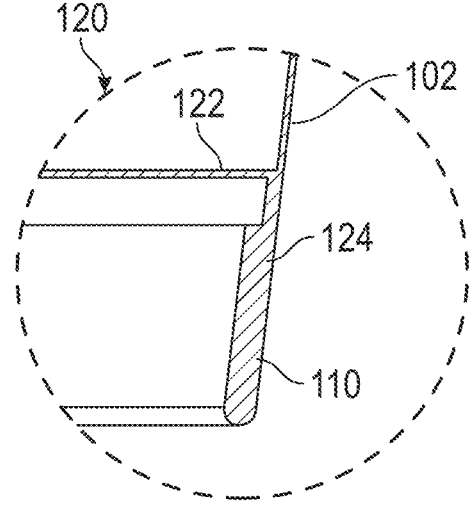
120
122
102
124
110
FIG. 14

ALUMINUM CUP

RELATED APPLICATIONS

This application claims the benefit of priority U.S. Provisional Patent Application No. 63/564,493, entitled "ALUMINUM CUP" and filed on Mar. 12, 2024, the disclosure of which is hereby incorporated by reference in its entirety for all purposes.

TECHNICAL FIELD

The present disclosure relates generally to aluminum cups, including, but not limited to materials and methods for making aluminum cups.

BACKGROUND

Single-use cups are often used in applications where reusable cups are not available or impractical for reuse. In conventional applications, single-use cups are formed from paper, plastic, or foam.

Since single-use cups are often not readily recyclable and disposed or discarded after use, conventional single-use cups constitute a major source of household and commercial waste (i.e. Municipal Solid Waste).

SUMMARY

Accordingly, there is a need for single-use or disposable cups that are recyclable and provide a desired level of performance while being manufactured in a rapid and cost-effective manner.

The present disclosure describes aluminum cups that are recyclable and can be manufactured in a rapid and cost-effective manner. In some applications, the aluminum cups can be formed from an aluminum material that includes polymer layers on either side, facilitating manufacturing of the cups. Advantageously, the aluminum material can simplify manufacturing, increase production rates and minimizing costs. Further, in some applications, aluminum cups can be more easily reused than certain conventional cups.

The aluminum cups can be formed from a cup side wall and a cup bottom that are punched or cut from the aluminum material described above. The cup side wall can be formed into a frustoconical shape and bonded together. In some applications, the cup side wall can have a constant taper without any steps or bumps.

In some applications, the polymer layers of the aluminum material can be bonded together using heat to form the cup side wall. In some embodiments, the polymer layers are ultrasonically welded together. Optionally, the aluminum material may only include polymer at the edges of the cup side wall to facilitate bonding. Further, an upper edge of the cup side wall can be rolled to form a lip and add rigidity.

In some applications, the cup bottom can be bonded to a bottom portion of the cup side wall. Similarly, the polymer layers of the aluminum material can be bonded together using heat to form the cup bottom and the cup side wall together. In some embodiments, the cup bottom is ultrasonically welded with the cup side wall.

In some applications the aluminum material can include an aluminum foil layer with a thickness between 80 to 180 microns. A first polymer layer can be disposed on a first surface of the aluminum foil layer and have a thickness of between 5 to 60 microns. A second polymer layer can be disposed on an opposite side of the aluminum foil layer and have a thickness of between 5 to 60 microns. In some embodiments, the polymer layers can be laminated and/or coated onto the aluminum foil layer. In some applications, the polymer layers can be formed from biaxially oriented polypropylene, low-density polyethylene, or polyethylene terephthalate. As described herein, the polymer layers can be designed or configured to bond with each other. In some applications, the aluminum material can be configured to be compatible with cup forming processes, equipment, and/or machinery that were previously configured for the manufacture of paper cups.

As discussed previously, certain conventional single-use or disposable cups may be costly, difficult, and/or time consuming to manufacture while not being readily recyclable. The present disclosure includes embodiments that are readily recyclable and provide a desired level of performance while being manufactured in a rapid and cost-effective manner. Embodiments of the present disclosure can utilize an aluminum and polymer material that can be compatible with cup forming processes, equipment, and/or machinery that were previously configured for the manufacture of paper cups.

In one aspect, some embodiments include an aluminum cup including a cup side wall including: an aluminum foil layer; a first polymer layer disposed on a first surface of the aluminum foil layer; and a second polymer layer disposed on a second surface of the aluminum foil layer opposite the first surface, wherein a first perpendicular edge of the cup side wall is heat-bonded to a second perpendicular edge of the cup side wall to bond the first polymer layer to the second polymer layer.

In another aspect, some embodiments include an aluminum cup including: a cup side wall including: an aluminum foil wall layer; and a first polymer wall layer disposed on a first surface of the aluminum foil wall layer; and a cup bottom including: an aluminum foil bottom layer; and a first polymer bottom layer disposed on a first bottom surface of the aluminum foil bottom layer, wherein the cup side wall is heat-bonded to the cup bottom to bond the first polymer wall layer to the first polymer bottom layer.

In another aspect, some embodiments include an aluminum cup including: a cup side wall including: an aluminum foil layer comprising a foil thickness of between 80 to 180 microns; a first polymer layer disposed on a first surface of the aluminum foil layer, the first polymer layer comprising a first polymer thickness of between 5 to 60 microns; and a second polymer layer disposed on a second surface of the aluminum foil layer opposite the first surface, the second polymer layer comprising a second polymer thickness of between 5 to 60 microns, wherein a first perpendicular edge of the cup side wall is heat-bonded to a second perpendicular edge of the cup side wall to bond the first polymer layer to the second polymer layer to form the cup side wall in a frustoconical shape; a rolled lip at an upper edge of the cup side wall; and a cup bottom including: an aluminum foil bottom layer; and a first polymer bottom layer disposed on a first bottom surface of the aluminum foil bottom layer, wherein the cup side wall is heat-bonded to the cup bottom to bond the first polymer layer of the cup side wall to the first polymer bottom layer.

In another aspect, some embodiments include a method to form a heat-bonded aluminum cup, the method including: forming a cup side wall in a frustoconical shape, the cup side wall including: an aluminum foil layer; a first polymer layer disposed on a first surface of the aluminum foil layer; and a second polymer layer disposed on a second surface of the aluminum foil layer opposite the first surface; and heat-bonding a first perpendicular edge of the cup side wall to a second perpendicular edge of the cup side wall to bond the first polymer layer to the second polymer layer.

In another aspect, some embodiments include a method to form a heat-bonded aluminum cup, the method including: heat-bonding a cup side wall to a cup bottom, the cup side wall including: an aluminum foil wall layer; and a first polymer wall layer disposed on a first surface of the aluminum foil wall layer; and the cup bottom including: an aluminum foil bottom layer; and a first polymer bottom layer disposed on a first bottom surface of the aluminum foil bottom layer.

In another aspect, some embodiments include a method to form a heat-bonded aluminum cup, the method including: punching a cup side wall from a sheet including: an aluminum foil layer including a foil thickness of between 80 to 180 microns; a first polymer layer including a first polymer thickness of between 5 to 60 microns; and a second polymer layer including a second polymer thickness of between 5 to 60 microns; overlapping a first perpendicular edge of the cup side wall over a second perpendicular edge of the cup side wall to form a frustoconical shape; heat-bonding the first perpendicular edge of the cup side wall to the second perpendicular edge of the cup side wall to bond the first polymer layer to the second polymer layer; rolling an upper edge of the cup side wall to form a lip; punching a cup bottom from the sheet; and heat-bonding the cup side wall to the cup bottom.

Thus, embodiments, materials, and methods are provided that allow for cups that are recyclable and provide a desired level of performance while being manufactured in a rapid and cost-effective manner.

BRIEF DESCRIPTION OF THE DRAWINGS

For a better understanding of the various described embodiments, reference should be made to the detailed description below, in conjunction with the following drawings in which like reference numerals refer to corresponding parts throughout the figures.

FIG. 13 is a cross-sectional view of the cup side wall and cup bottom in accordance with some embodiments.

FIG. 14 is a detail view of the cup side wall and the cup bottom of FIG. 13.

4

Figure 15:
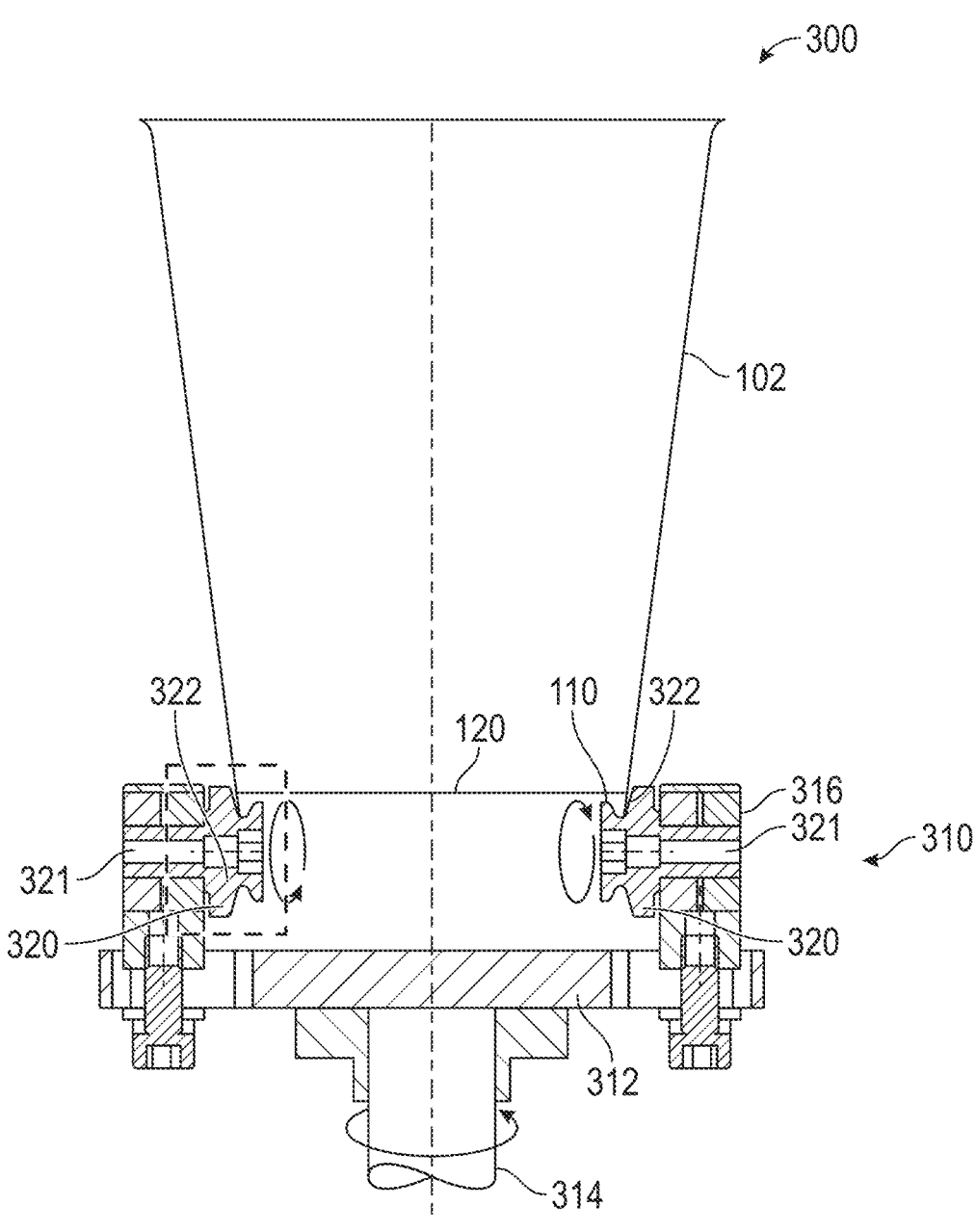

FIG. 15 is a cross-sectional view of a roller assembly for manufacturing the cup in accordance with some embodiments.

Figure 16:
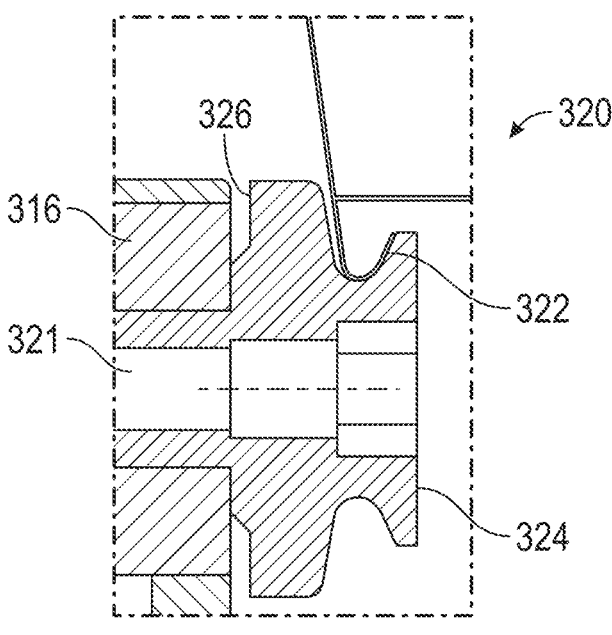

FIG. 16 is a cross-sectional view of a roller and cup of FIG. 15.

Figure 17:
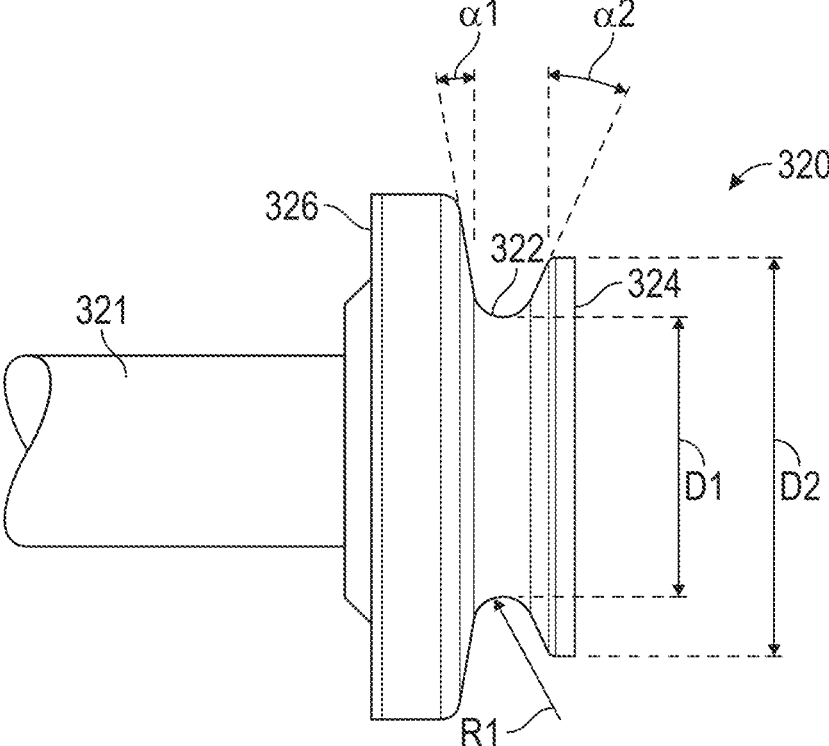

FIG. 17 is a side elevation view of the roller of FIG. 16.

Figure 18:
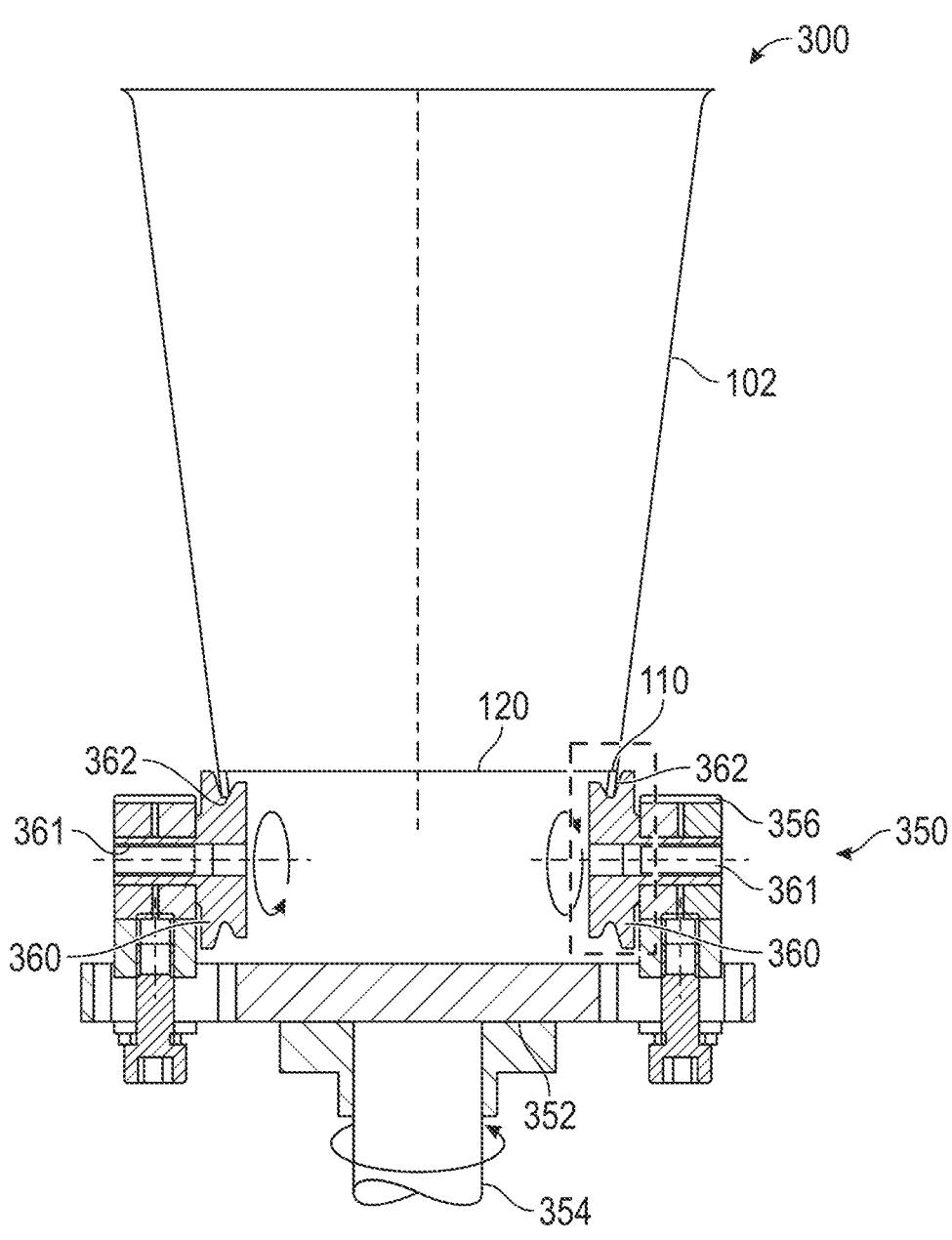

FIG. 18 is a cross-sectional view of a roller assembly for manufacturing the cup in accordance with some embodiments.

Figure 19:
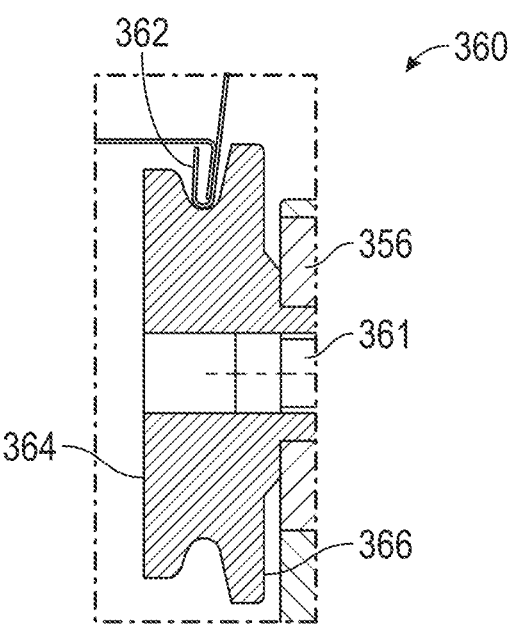

FIG. 19 is a cross-sectional view of a roller and cup of FIG. 18.

Figure 20:
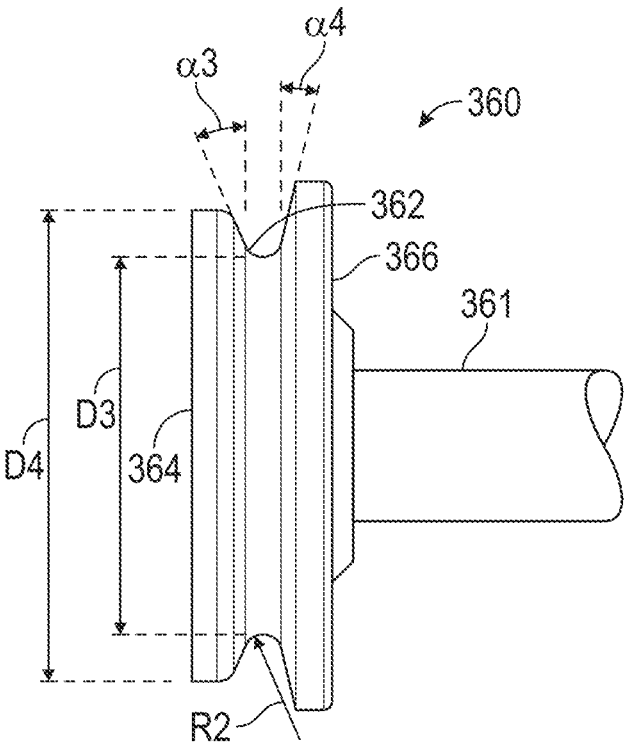

FIG. 20 is a side elevation view of the roller of FIG. 19.

Figures 21, 22:
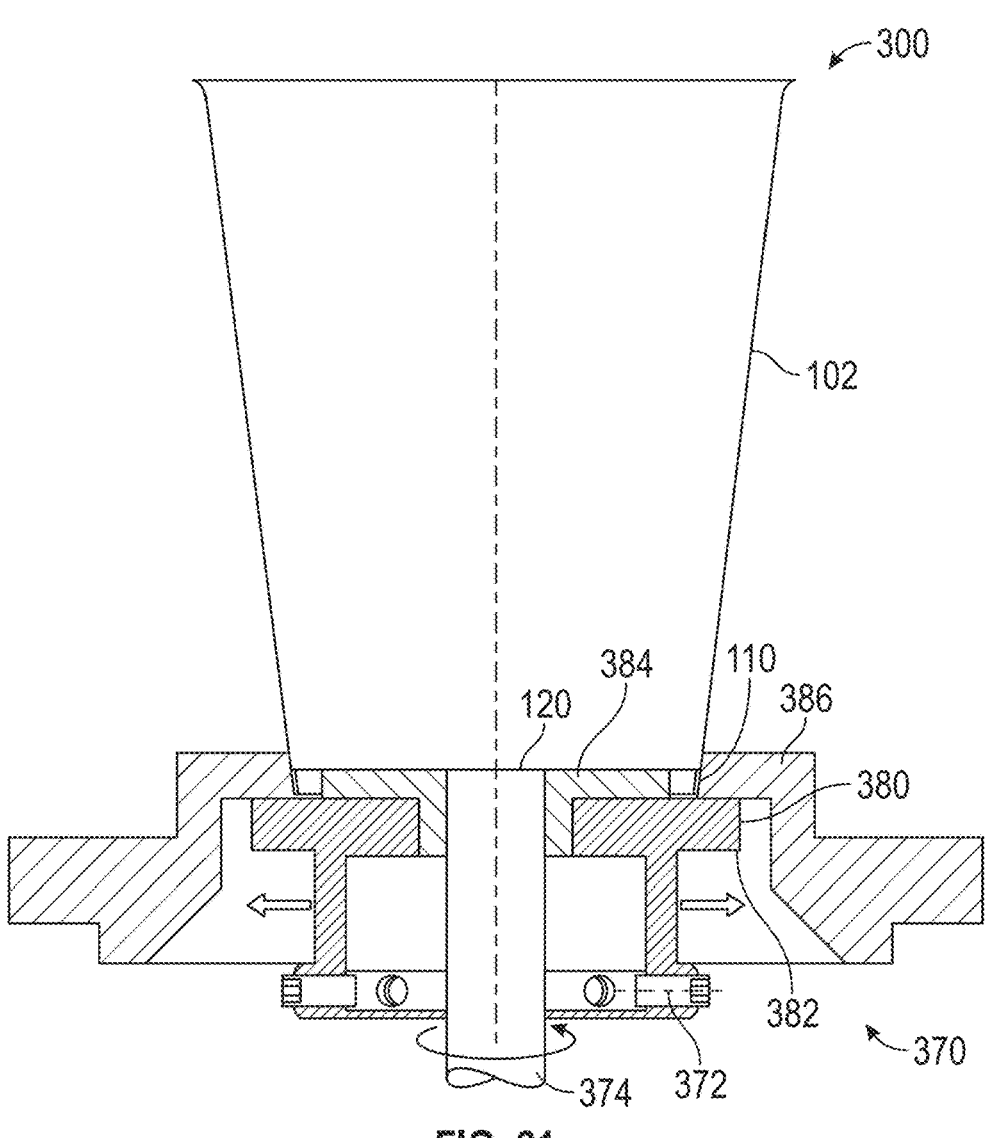

FIG. 21 is a cross-sectional view of a welding assembly for manufacturing the cup in accordance with some embodiments.

FIG. 22 is a detail view of the welding assembly of FIG. 21.

Figure 23:
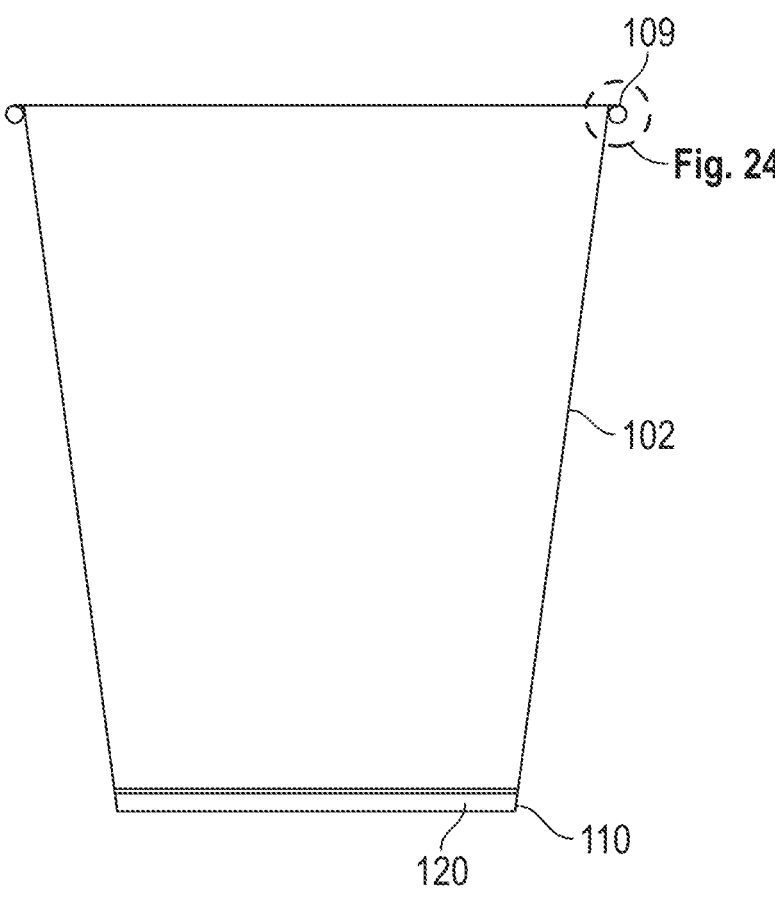

FIG. 23 is a cross-sectional view of the cup side wall and cup bottom in accordance with some embodiments.

Figure 24:
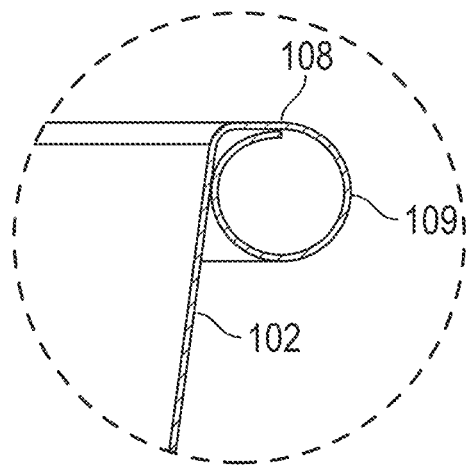

FIG. 24 is a detail view of a lip of the cup side wall of FIG. 23.

Figures 25, 26:
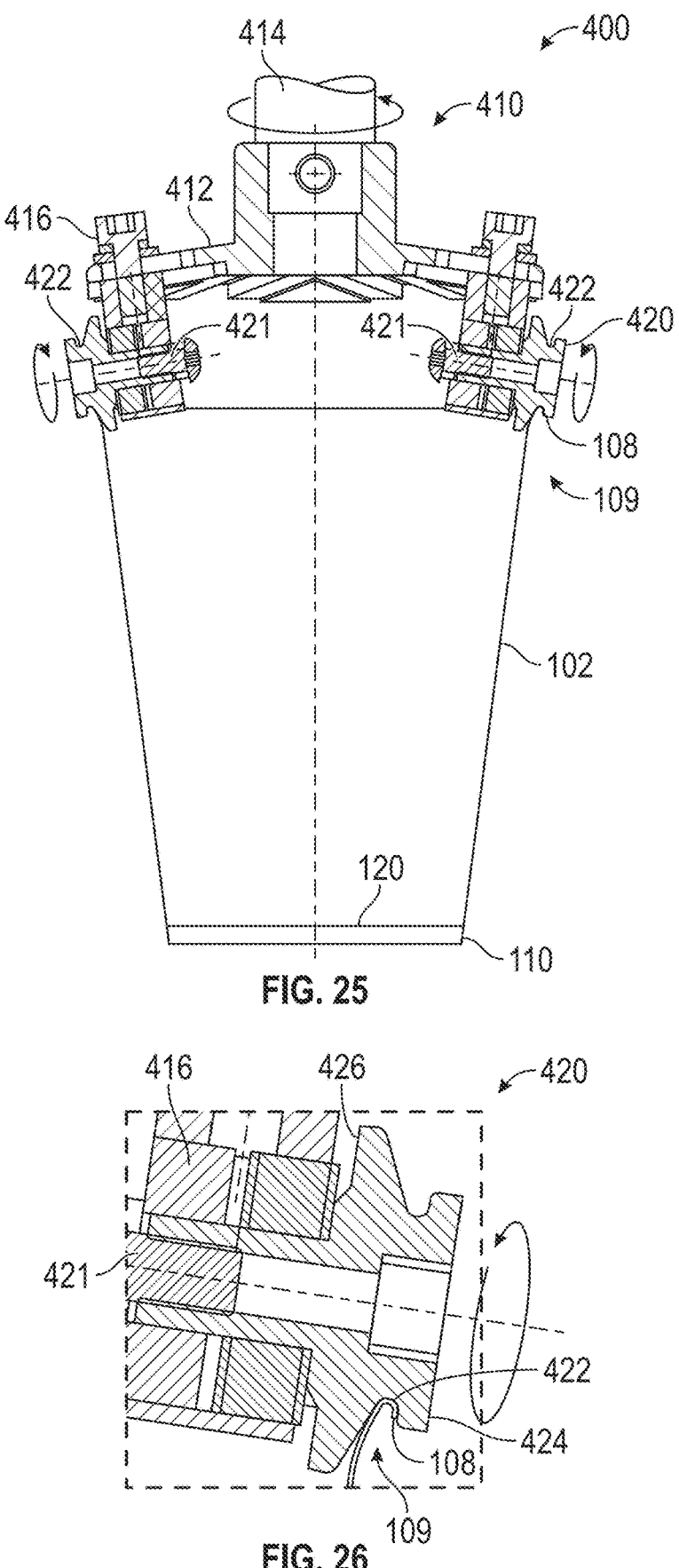

FIG. 25 is a roller assembly for manufacturing the cup in accordance with some embodiments.

FIG. 26 is a detail view of the roller and cup of FIG. 25.

Figure 27:
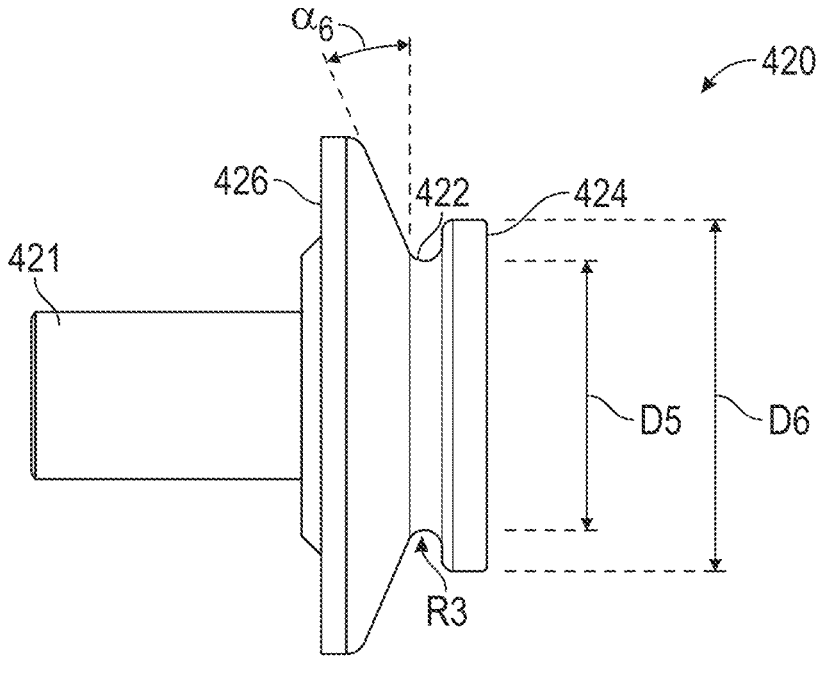

FIG. 27 is a detail view of the roller of FIG. 26.

Figure 28:
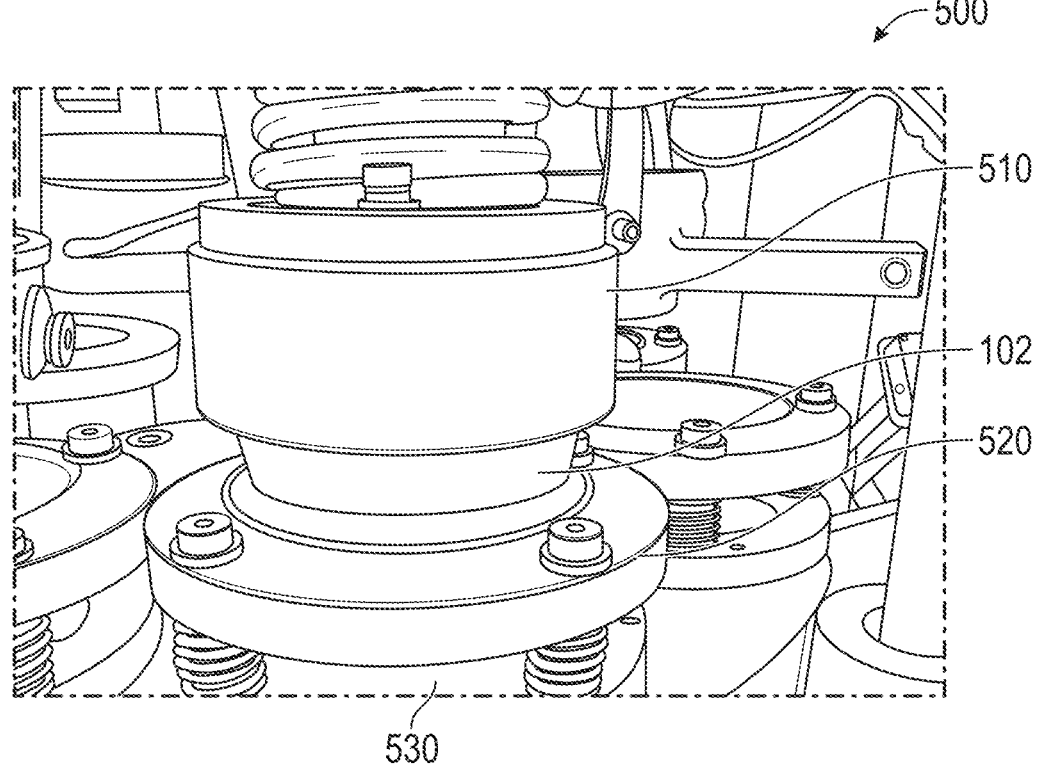

FIG. 28 is a perspective view of a rolling assembly for manufacturing a cup in accordance with some embodiments.

Figure 29:
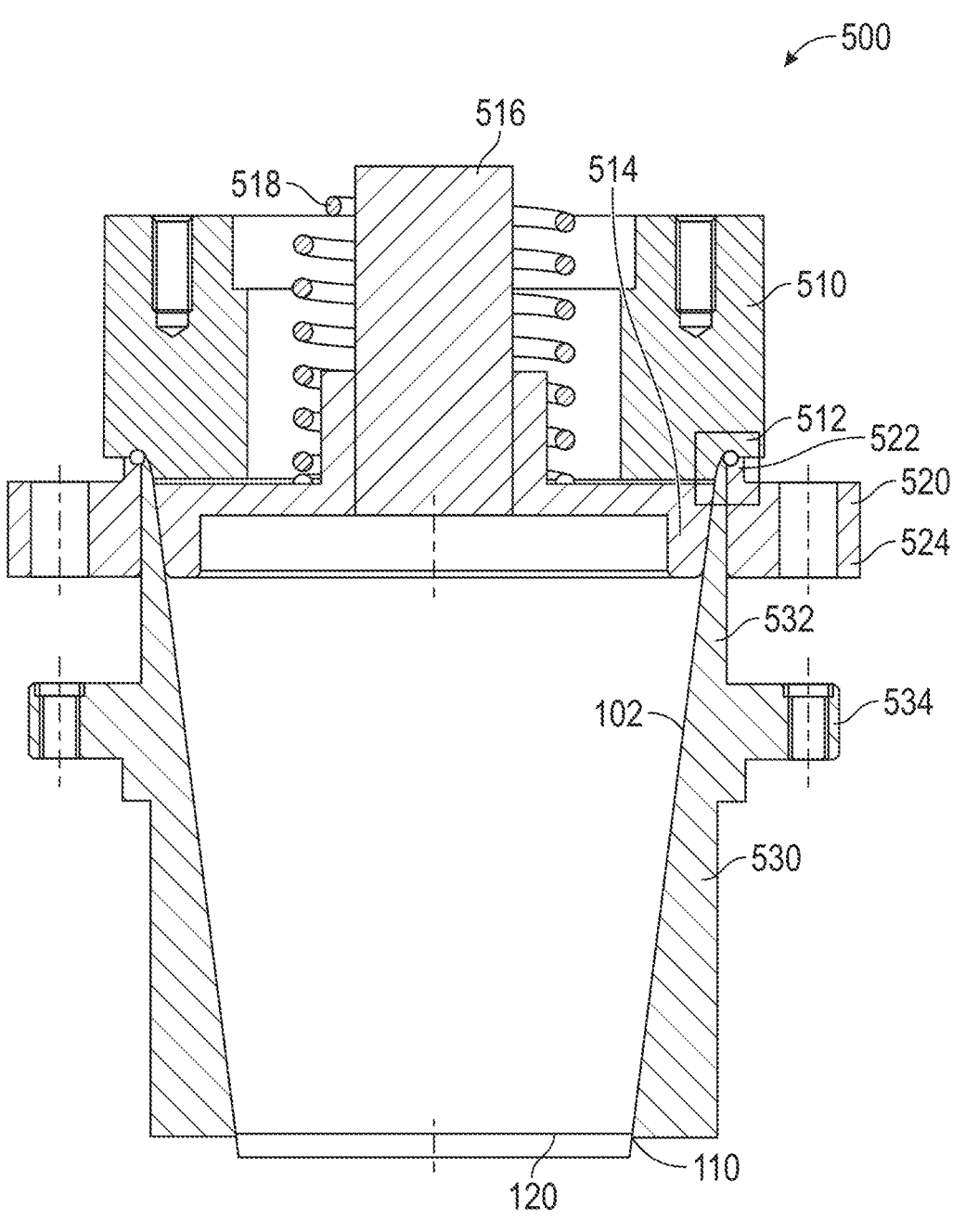

FIG. 29 is a cross-sectional view of the rolling assembly of FIG. 28.

Figure 30:
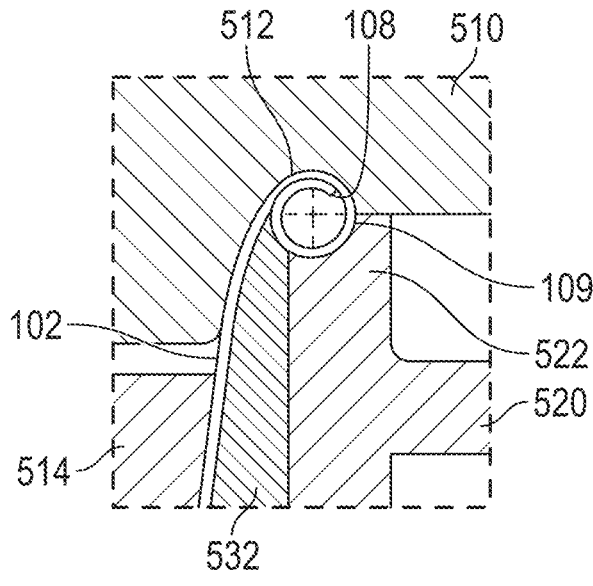

FIG. 30 is a detail view of the rolling assembly and cup of FIG. 29.

Figure 31:
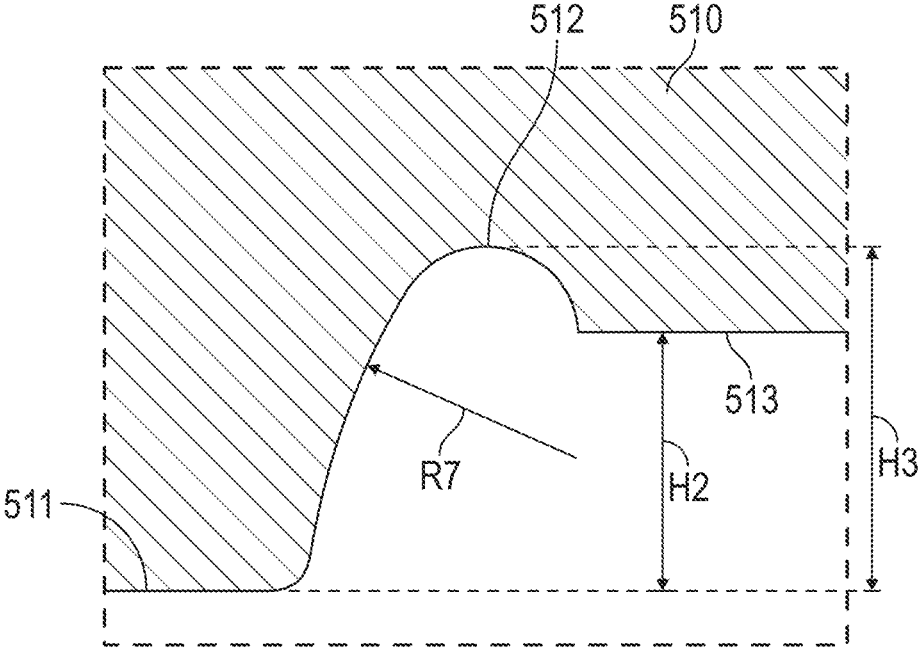

FIG. 31 is a cross-sectional view of an upper die of the rolling assembly of FIG. 29.

Figure 32:
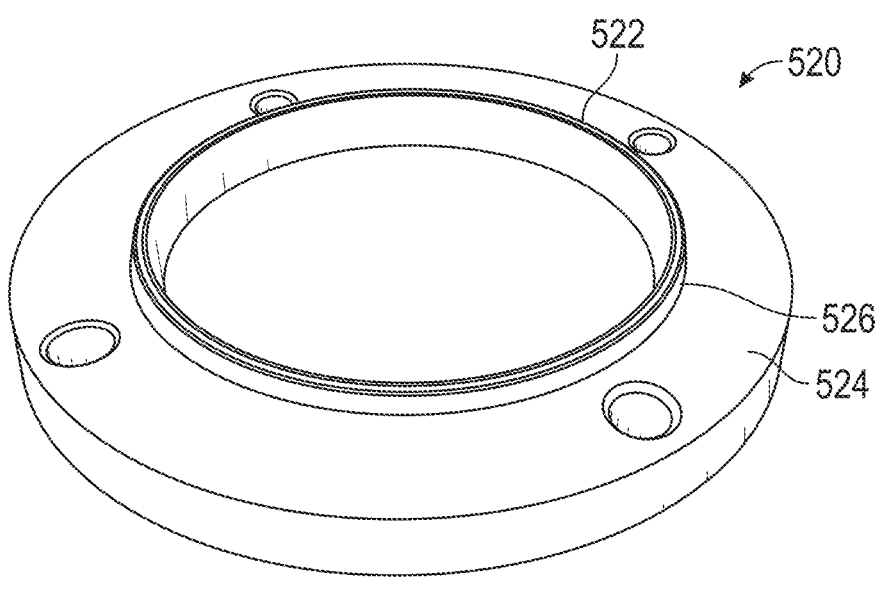
Figure 33:
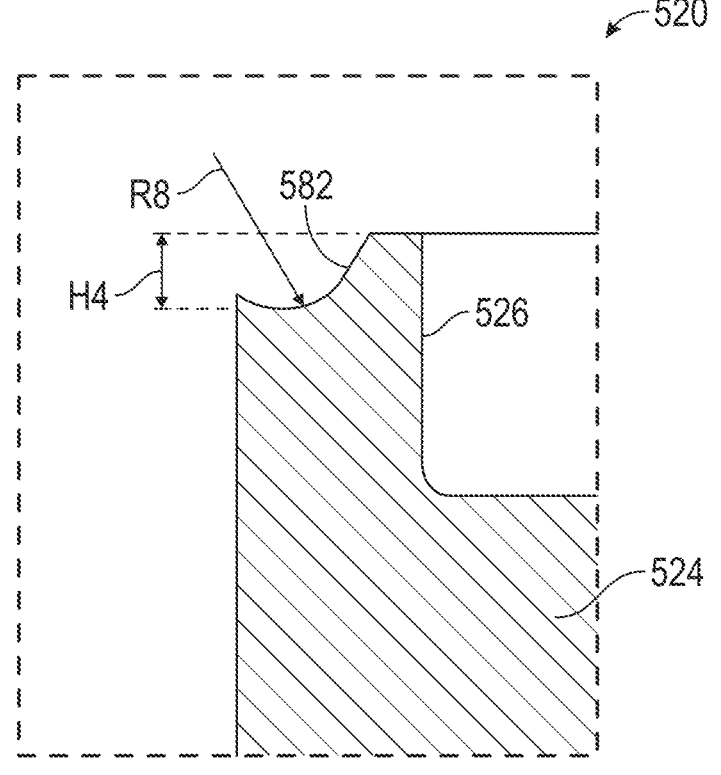

FIG. 32 is a perspective view of a lower die of the rolling assembly of FIG. 29. FIG. 33 is a detail view of the lower die of FIG. 32.

Figure 34:
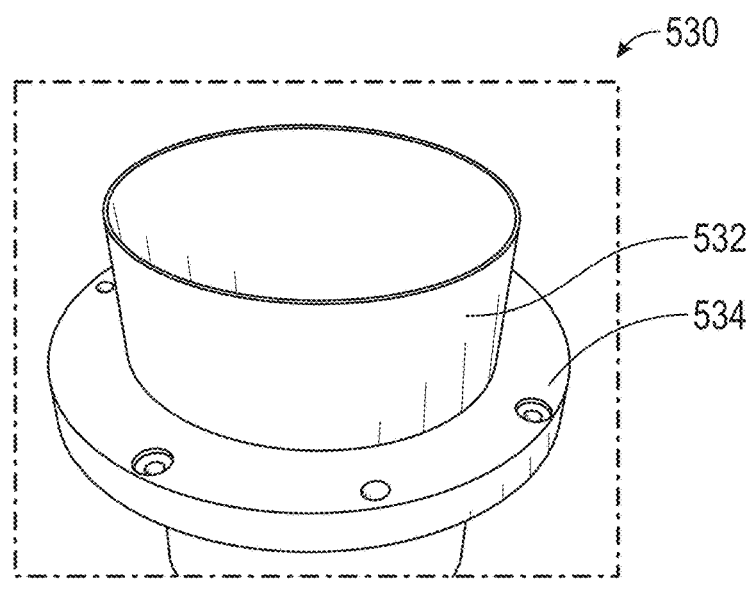

FIG. 34 is a perspective view of a receiving cone of the rolling assembly of FIG. 29.

Figure 35:
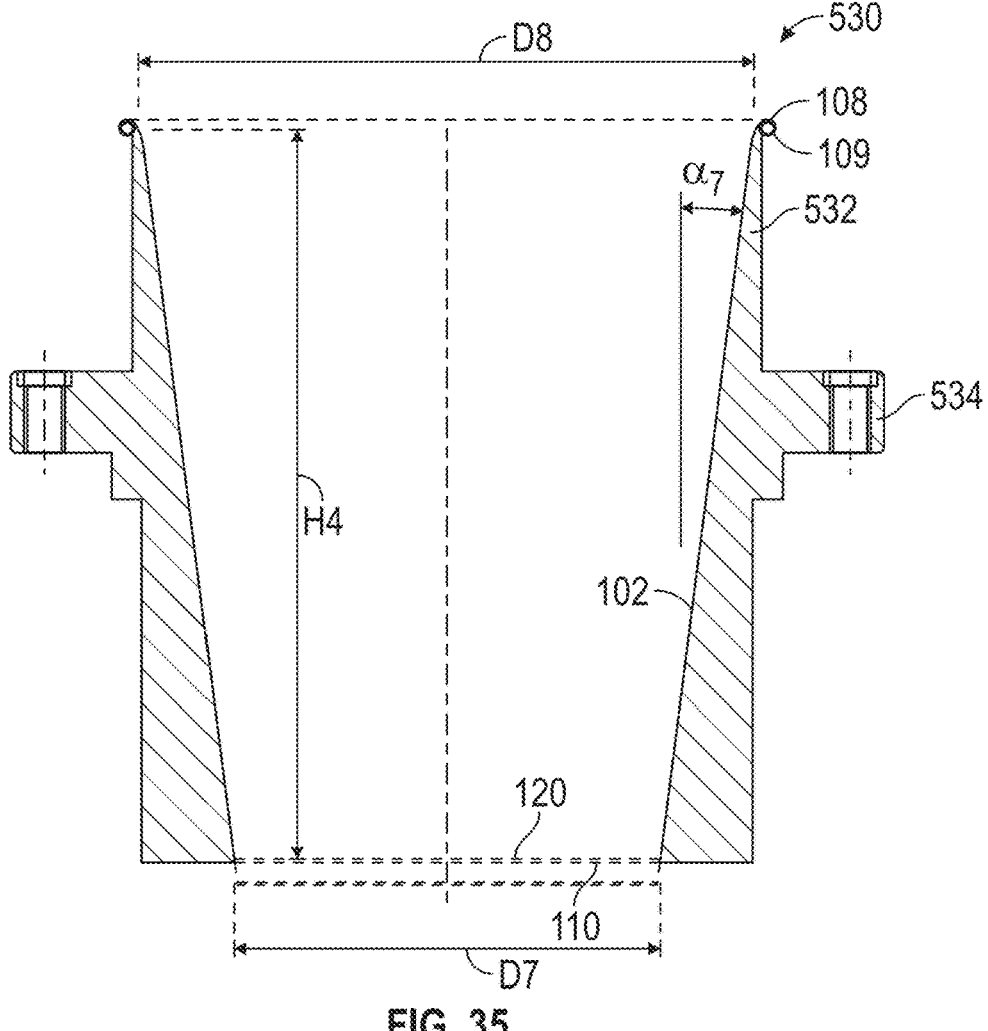

FIG. 35 is a cross-sectional view of the receiving cone of FIG. 34.

DETAILED DESCRIPTION

The present disclosure describes various embodiments of aluminum cups and materials and methods for forming aluminum cups. In some embodiments, the aluminum cups can be formed from an aluminum material that includes polymer layers on either side, facilitating manufacturing of the cups.

Figure 1:
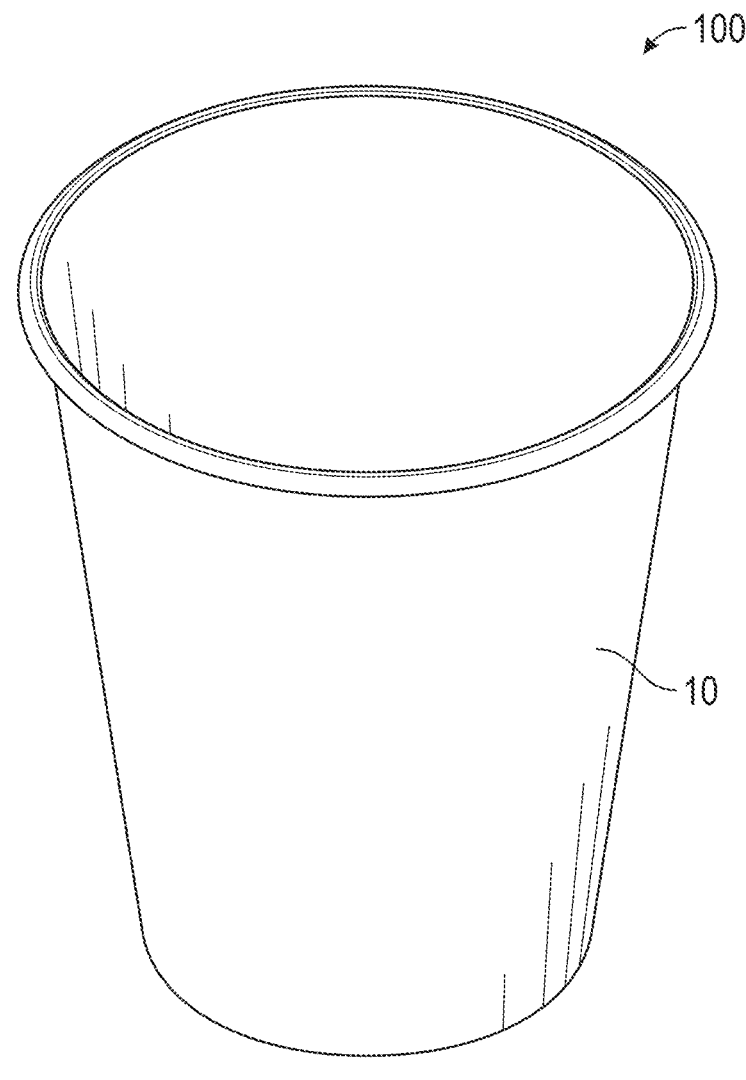
FIG. 1 is a perspective view of an aluminum cup in accordance with some embodiments.

FIG. 1 is a perspective view of an aluminum cup 100 in accordance with some embodiments. With reference to FIG. 1, the aluminum cup 100 is a disposable cup that is readily recyclable. As described herein, the aluminum cup 100 is recyclable and manufactured in a rapid and cost-effective manner. In some embodiments, the aluminum cup 100 is formed generally in the shape of certain conventional paper cups. As illustrated, the side walls of the aluminum cup 100 have a generally frustoconical shape. In some embodiments, the side walls of the aluminum cup 100 have a constant taper similar to a conventional paper cup. Further, in accordance with some embodiments, since the aluminum cup 100 can be formed without specialized pressing or extrusion processes the aluminum cup 100 can be free from steps or changes in taper.

Figure 2:
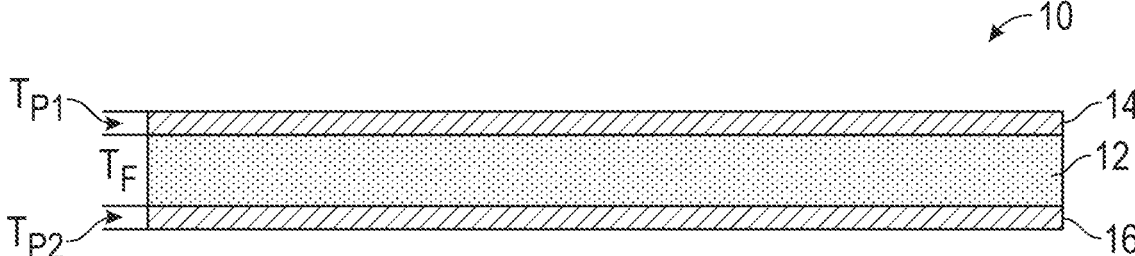
FIG. 2 is a cross-sectional view of material to form an aluminum cup, such as the aluminum cup of FIG. 1, in accordance with some embodiments.

With reference to FIG. 2, in some embodiments, the aluminum cup 100 is formed from an aluminum material 10. Advantageously, the use of the aluminum material 10 allows for the resulting aluminum cup 100 to be recyclable while allowing the aluminum material 10 to be formed, shaped, processed, or otherwise manufactured using simplified manufacturing processes.

In the depicted example, the aluminum material 10 includes an aluminum foil layer 12. Advantageously, the inclusion of the aluminum foil layer 12 allows the aluminum material 10 to be readily recyclable. As illustrated, the aluminum foil layer 12 includes a foil thickness $T_F$. In some embodiments, the foil thickness $T_F$ of the aluminum foil layer 12 can range between 80 to 180 microns. In some embodiments the foil thickness $T_F$ of the aluminum foil layer 12 can range between 80 to 150 microns. Further, in some embodiments, the foil thickness $T_F$ of the aluminum foil layer 12 can be approximately 120 microns. In some applications the foil thickness $T_F$ of the aluminum foil layer 12 can be at least 80 microns.

In some embodiments, the aluminum material 10 can include a first polymer layer 14 disposed on an upper surface of the aluminum foil layer 12. Advantageously, the inclusion of the first polymer layer 14 can allow for the aluminum material 10 to bond with itself and other components. As described herein, the first polymer layer 14 can be heated (e.g. via hot heat head and/or ultrasonic welding) to create a bond with itself or another component. In some embodiments, one side of the aluminum material 10 can bond with the same side of the aluminum material 10. In other words, the first polymer layer 14 can bond with other portions of the first polymer layer 14.

In some embodiments, the first polymer layer 14 can be formed from biaxially oriented polypropylene, low-density polyethylene, polyethylene terephthalate, or any other suitable polymer. In some embodiments, the first polymer layer 14 is laminated with an adhesive on the upper surface of the aluminum foil layer 12. Further, the first polymer layer 14 may be coated on to the upper surface of the aluminum foil layer 12.

As illustrated, the first polymer layer 14 includes a polymer thickness $T_{P1}$. In some embodiments, the polymer thickness $T_{P1}$ of the first polymer layer 14 can range between 5 to 60 microns. In some embodiments the polymer thickness $T_{P1}$ of the first polymer layer 14 can range between 5 to 30 microns. In some embodiments, the polymer thickness $T_{P1}$ of the first polymer layer 14 can range between 12 to 60 microns. Further, in some embodiments, the polymer thickness $T_{P1}$ of the first polymer layer 14 can range between 12 to 25 microns. In some applications the polymer thickness $T_{P1}$ of the first polymer layer 14 can be at least 5 microns.

Similarly, the aluminum material 10 can include a second polymer layer 16 disposed on a lower surface of the aluminum foil layer 12, opposite to the first polymer layer 14. Advantageously, the inclusion of the second polymer layer 16 can allow for the aluminum material 10 to bond with itself and other components. As described herein, the second polymer layer 16 can be heated (e.g. via hot heat head gun and/or ultrasonic welding) to create a bond with itself or another component. In some embodiments, one side of the aluminum material 10 can bond with the same side of the aluminum material 10. In other words, the second polymer layer 16 can bond with other portions of the second polymer layer 16. Further, in some applications, one side of the aluminum material 10 can bond with an opposing side of the aluminum material 10. In other words, the first polymer layer 14 can bond with the second polymer layer 16.

In some embodiments, the second polymer layer 16 can be formed from biaxially oriented polypropylene, low-density polyethylene, polyethylene terephthalate, or any other suitable polymer. In some embodiments, the second polymer layer 16 is laminated with an adhesive on the lower surface of the aluminum foil layer 12. Further, the second polymer layer 16 may be coated on to the lower surface of the aluminum foil layer 12. In some embodiments, the second polymer layer 16 can be formed from a different material and/or applied in a different manner than the first polymer layer 14.

As illustrated, the second polymer layer 16 includes a polymer thickness $T_{P2}$. In some embodiments, the polymer thickness $T_{P2}$ of the second polymer layer 16 can range between 5 to 60 microns. In some embodiments the polymer thickness $T_{P2}$ of the second polymer layer 16 can range between 5 to 30 microns. In some embodiments, the polymer thickness $T_{P2}$ of the second polymer layer 16 can range between 12 to 60 microns. Further, in some embodiments, the polymer thickness $T_{P2}$ of the second polymer layer 16 can range between 12 to 25 microns. In some applications, the polymer thickness $T_{P2}$ of the second polymer layer 16 can be at least 5 microns. In some embodiments, the second polymer layer 16 can have a different polymer thickness $T_{P2}$ than the polymer thickness $T_{P1}$ of the first polymer layer 14.

Advantageously, the arrangement of the aluminum foil layer 12 with the first and second polymer layers 14, 16 can allow the resulting aluminum material 10 have a desired form and rigidity, while facilitating bonding between portions of the aluminum cup 100 and complying with any relevant health regulations.

As described herein, the aluminum material 10 can be formed, processed, or otherwise manufactured into an aluminum cup, such as aluminum cup 100 described above. Any suitable process can be utilized to form the aluminum material 10 into aluminum cups 100.

In some applications, the characteristics of the aluminum material 10 allow aluminum cups 100 to be manufactured with one or more processes that are similar to or adapted from manufacturing processes of certain paper cups. Therefore, in certain applications, the aluminum material 10 may be processed in a manner similar to paper used for paper cup manufacturing. In other words, in some embodiments, the aluminum material 10 can be used with certain paper cup manufacturing machines or processes to manufacture aluminum cups 100. In some applications, operational parameters of certain equipment may need to be modified for use with the aluminum material 10 (e.g. rate of manufacturing, bonding temperature). Advantageously, by using or adapting machines previously configured for paper cup manufacturing, recyclable aluminum cups can be manufactured rapidly and in a cost-effective manner. In contrast, certain conventional manufacturing processes for recyclable cups may be costly, require specialized machinery or processes (e.g. extrusion or casting), and may be time-intensive.

Figures 3, 4:
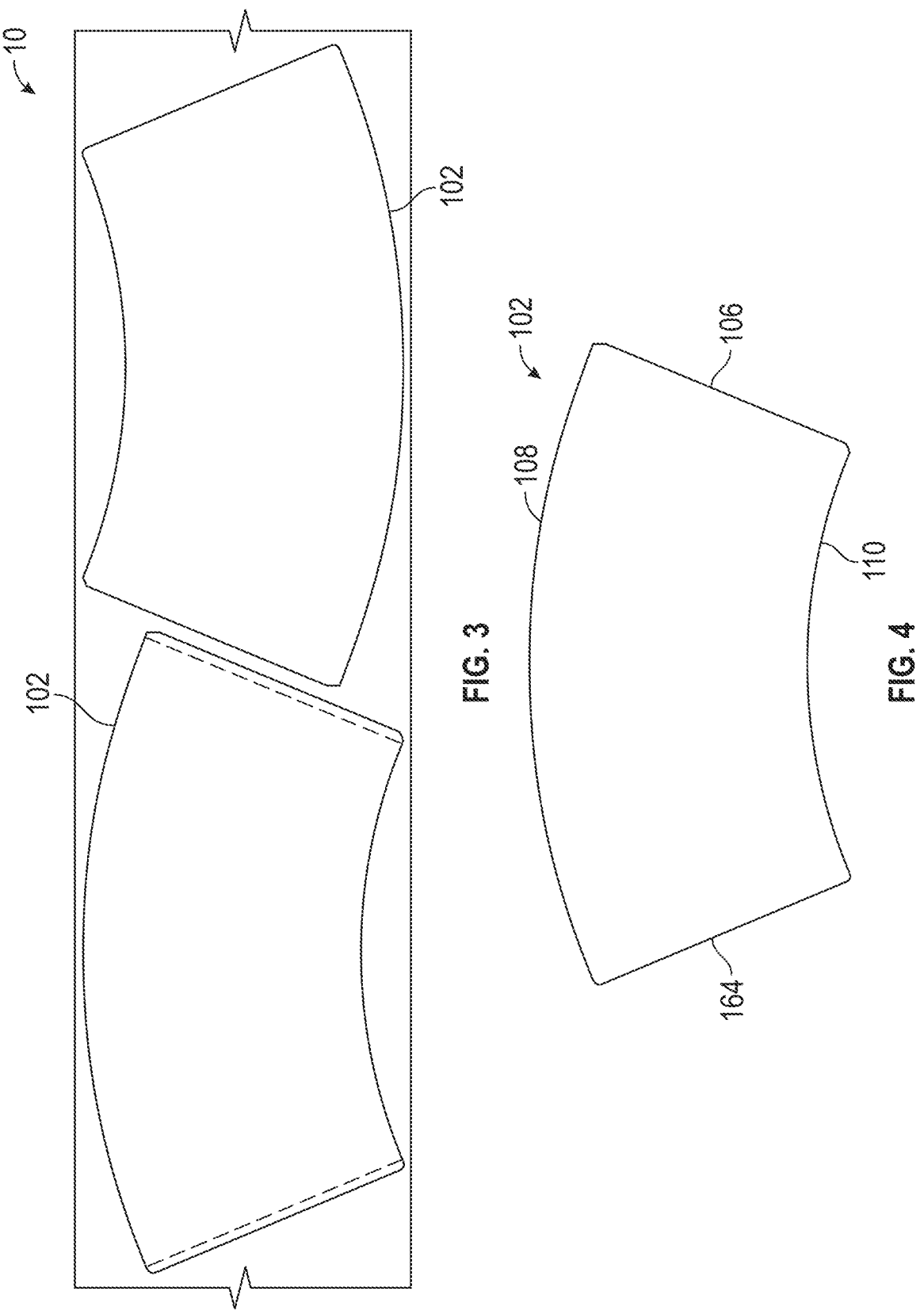
FIG. 3 is an elevation view of the material of FIG. 2.
FIG. 4 is an elevation view of a cup side wall prior to forming in accordance with some embodiments.

An example of a process to manufacture an aluminum cup 100 from the aluminum material 10 is described herein. In some applications, portions of the aluminum material 10 can be moved between steps or stations either manually, automatically, or with the assistance of machinery. FIG. 3 is an elevation view of the aluminum material 10 of FIG. 2. With reference to FIG. 3, cup side walls 102 can be cut, punched, or otherwise separated from the aluminum material 10. In some embodiments, the cup side walls 102 can be cut or separated from the aluminum material 10 with a die. In some embodiments, the aluminum material 10 can be rolled or otherwise flattened before the cup side walls 102 are cut from the aluminum material 10.

Figure 5:
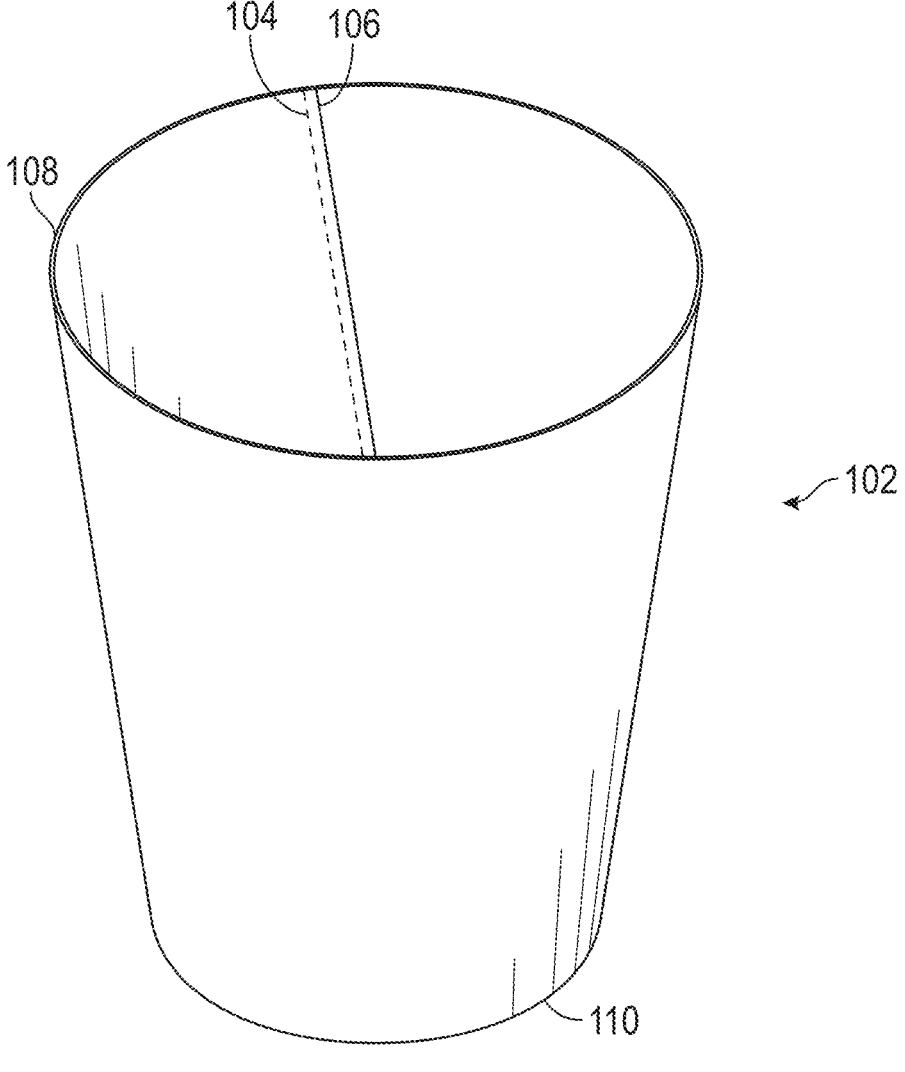
FIG. 5 is a perspective view of the cup side wall in accordance with some embodiments.

FIG. 4 is an elevation view of a cup side wall 102 in accordance with some embodiments. With reference to FIG. 4, the unformed cup side wall 102 can have a generally fan shape. FIG. 5 is a perspective view of the cup side wall 102 in accordance with some embodiments. With reference to FIGS. 4 and 5, the cup side wall 102 can be formed into a frustoconical shape. In some embodiments, the frustoconical shape of the cup side wall 102 can have a constant taper from an upper edge 108 to the bottom edge 110, free from steps or changes in taper. In some embodiments, the cup side wall 102 can be placed around a conical form. In some applications, the cup side wall 102 is manipulated and/or moved toward the conical form by a claw mechanism.

As illustrated, the perpendicular edges 104, 106 of the cup side wall 102 can be overlapped to form the frustoconical shape. During manufacturing, the overlapped perpendicular edges 104, 106 can be heated to bond the perpendicular edges 104, 106 to form a lap seal. As illustrated, one side of the cup side wall 102 can bond with an opposite side of the cup side wall 102, such that the first polymer layer 14 bonds with the second polymer layer 16. Optionally, the lap seal can be positioned or otherwise configured to align an interior portion of the cup side wall 102 with an exterior portion of the cup side wall 102. In some embodiments, a heating element or an ultrasonic welder is applied to bond the perpendicular edges 104, 106. In some applications, the lap seal between the perpendicular edges 104, 106 is watertight.

In some embodiments, the first polymer layer 14 is disposed on a portion of the cup side wall 102 adjacent to the first perpendicular edge 104 and the second polymer layer 16 is disposed on a portion of the cup side wall 102 adjacent to the second perpendicular edge 106 to facilitate bonding between the perpendicular edges 104, 106.

Figure 6:
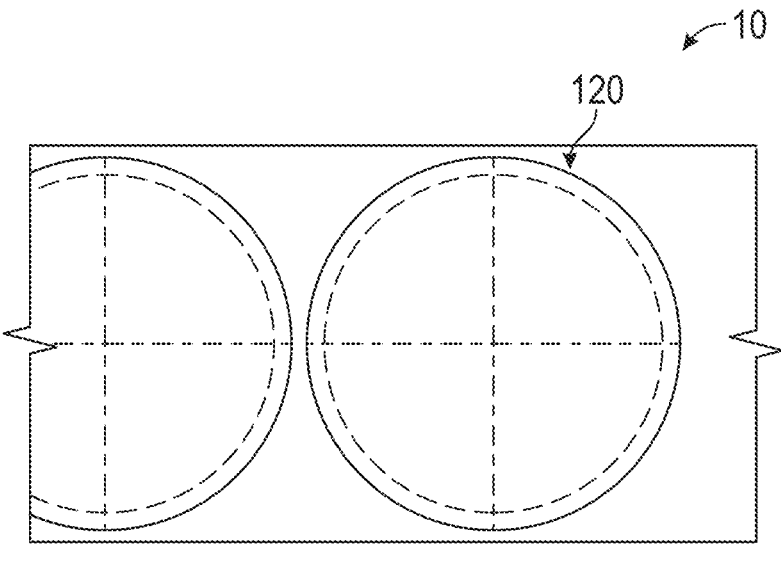
FIG. 6 is an elevation view of the material of FIG. 2 used for providing a cup bottom.

FIG. 6 is an elevation view of the aluminum material 10 of FIG. 2. With reference to FIG. 2, cup bottoms 120 can be cut, punched, or otherwise separated from the aluminum material 10. In some embodiments, the cup bottoms 120 can be cut or separated from the aluminum material 10 with a die. In some embodiments, the aluminum material 10 can be rolled or otherwise flattened before the cup bottoms 120 are cut from the aluminum material.

Figure 7:
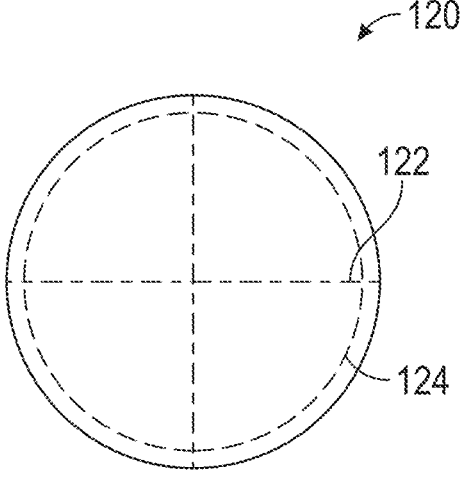
FIG. 7 is an elevation view of a cup bottom in accordance with some embodiments.

FIG. 7 is an elevation view of a cup bottom 120 in accordance with some embodiments. As illustrated, the cup bottom 120 has a generally circular profile. In some embodiments, the cup bottom 120 can be molded to fold back an edge 124 relative to the face 122 of the cup bottom 120.

Figure 8:
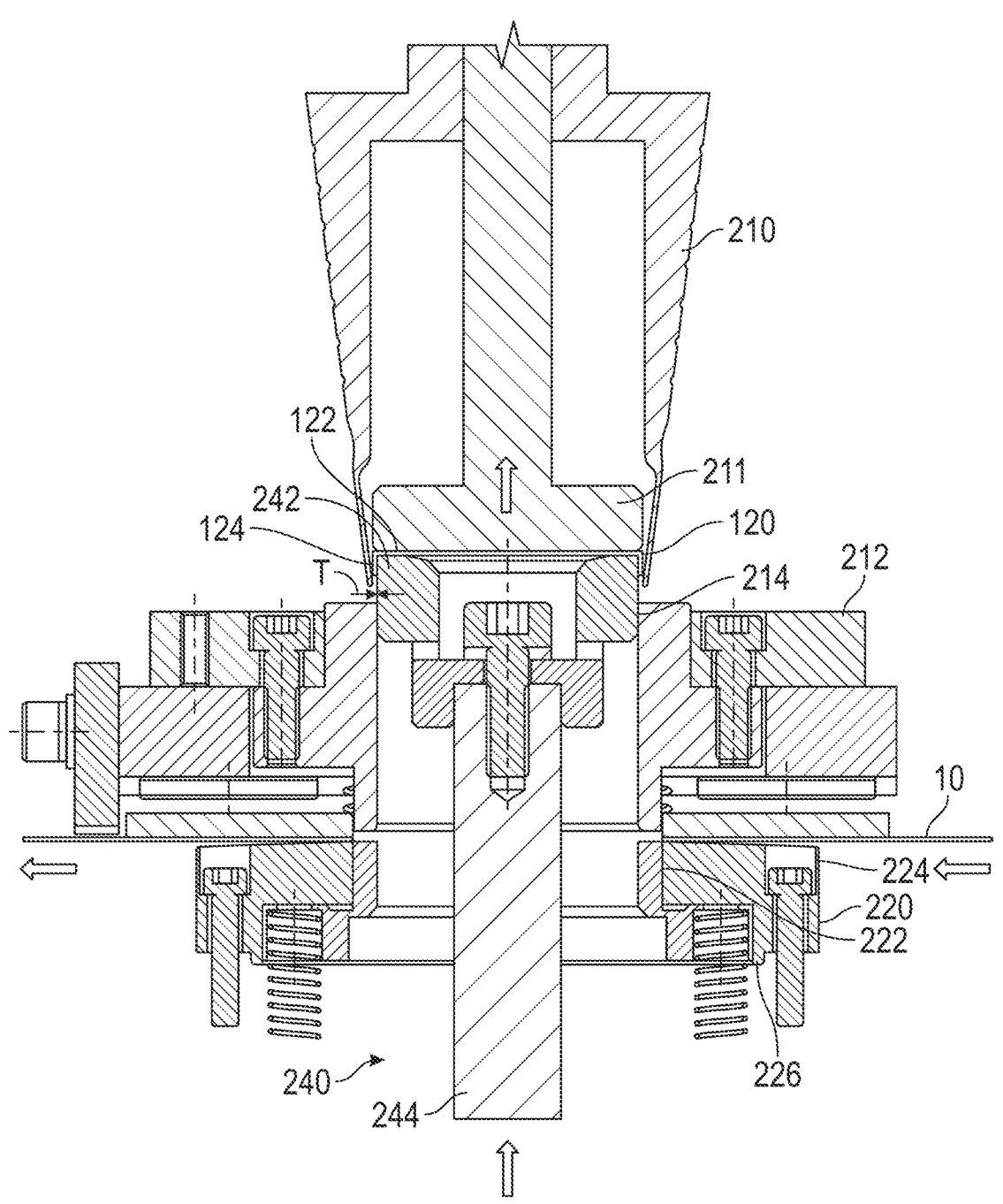
FIG. 8 is a perspective view of a die and cone for manufacturing the cup bottom in accordance with some embodiments.

FIG. 8 is a perspective view of a die and cone assembly 200 for manufacturing the cup bottom 120 in accordance with some embodiments. In some applications, the cup bottom 120 can be cut, punched, or otherwise separated from the aluminum material 10 using a die 220 and a punch 240. In the depicted example, the aluminum material 10 can be disposed between an upper die 212 and a lower die 220 as the punch 240 advances relative to the die 220. The motion of the punch 240 relative to the lower die 220 can cut, punch, or otherwise separate the cup bottom 120 from the aluminum material 10. As illustrated, the punch head 242 of the punch 240 can be advanced by shaft 244.

Figure 9A:
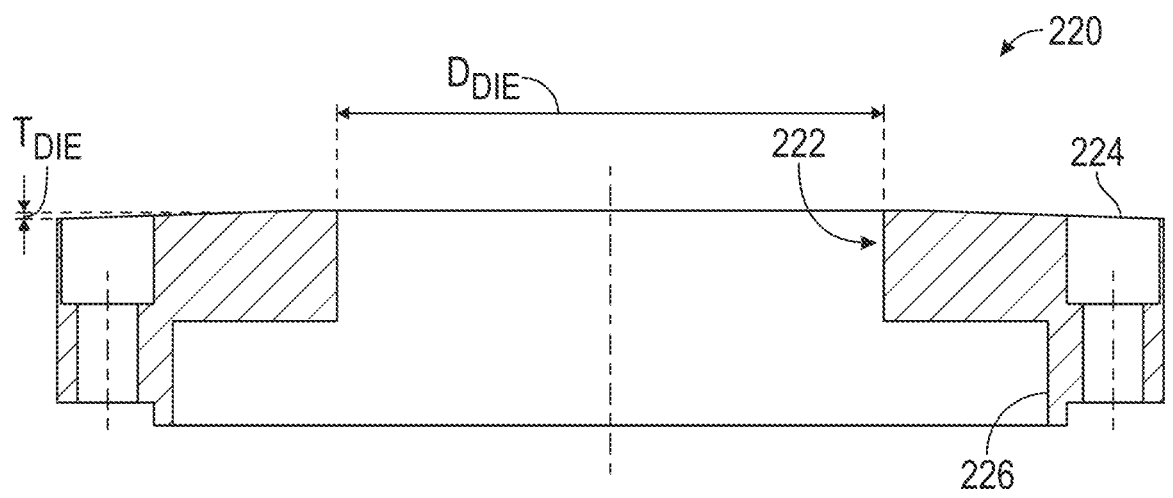
FIG. 9A is a cross-sectional view of the die of FIG. 8.
Figure 9B:
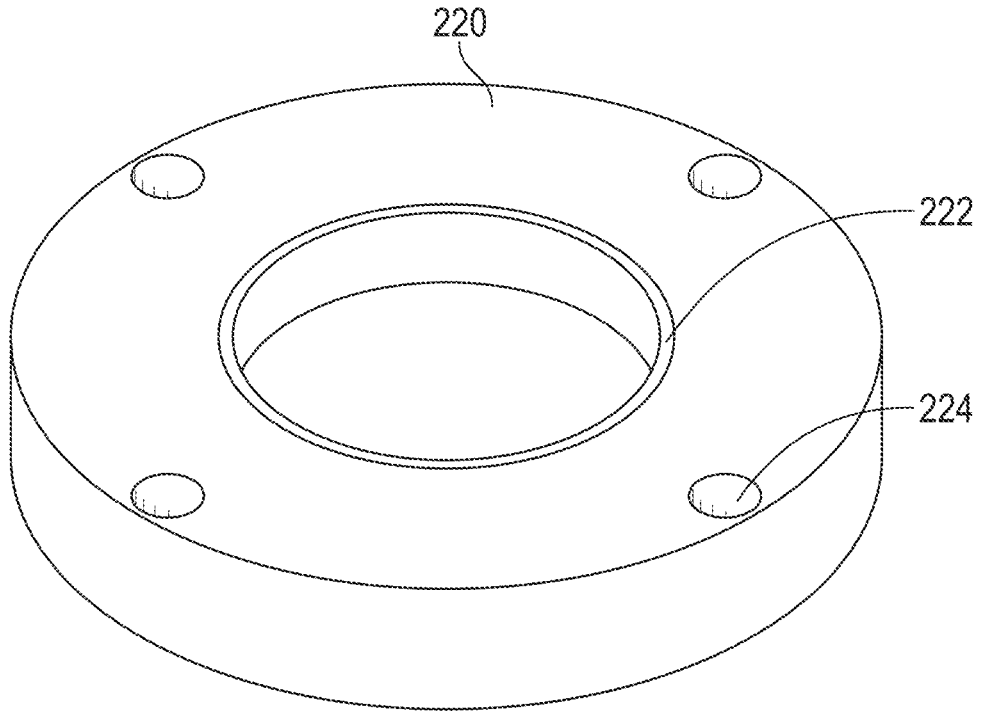
FIG. 9B is a perspective view of the die of FIG. 8.

FIG. 9A is a cross-sectional view of the lower die 220 of FIG. 8. FIG. 9B is a perspective view of the lower die 220 of FIG. 8. With reference to FIGS. 8-9B, the lower die 220 can have a generally circular profile. In some embodiments, the die cavity 222 can be surrounded by a concentric flange 224. As illustrated, the die 220 can include a relief cavity 226 disposed beneath the die cavity 222. In the depicted example, the punch head 242 is disposed within the die cavity 222. As the punch head 242 is advanced upward by the shaft 244, the punch head 242 can advance through the die cavity 222 and into an upper die cavity 214 of the upper die 212.

In the depicted example, the die cavity 222 and the punch head 242 can be dimensioned to facilitate the cutting, punching, or formation of the cup bottom 120. In some embodiments, the die cavity 222 can have a diameter DDIE that ranges between approximately 65 millimeters to approximately 80 millimeters (between approximately 2.56 inches to approximately 3.15 inches). In some embodiments, the tolerance between the die cavity 222 and the punch head 242 can be selected or otherwise controlled to allow the punch head 242 to travel through the die cavity 222. For example, the tolerance between the punch head 242 and the die cavity 222 can range between approximately 0.2 millimeters to approximately 1.5 millimeters (between approximately 0.008 inches and approximately 0.059 inches). Further, the tolerance T between the upper die cavity 214 and the punch head 242 can be selected or otherwise controlled to allow the punch head 242 to travel through the die cavity 222 and permit the cup bottom 120 to advance through the upper die cavity 214. In some applications, the tolerance T between the upper die cavity 214 and the punch head 242 can be selected or otherwise controlled to allow the edges 124 of the cup bottom 120 to fold relative to the face 122 as the punch head 242 is advanced. As illustrated, the edges 124 of the cup bottom 120 can fold downward relative to the face 122 as the punch head 242 is advanced upward relative to the upper die cavity 214. In some embodiments, the tolerance T between the punch head 242 and the upper die cavity 214 can range between approximately 0.2 millimeters to approximately 1.5 millimeters (between approximately 0.008 inches and approximately 0.059 inches).

In the depicted example, the flange 224 of the die 220 can be tapered to facilitate the movement of the aluminum material 10. In some embodiments, the flange 224 can be tapered by a taper value TDIE between approximately 0.5 millimeters to approximately 5 millimeters (between approximately 0.02 inches to approximately 0.20 inches) between an edge of the die cavity 222 to the edge of the flange 224. Advantageously, the dimensions of the die cavity 222, the tolerance between the die cavity 222 and the punch head 242, the tolerance between the upper die cavity 214 and the punch head 242, and the taper of the flange 224 can avoid tearing, deformation, or other undesired effects that a workpiece may be susceptible to during the formation of the cup bottom 120 from an aluminum material 10.

After formation, the cup bottom 120 can be captured within a cone 210. As illustrated, the cone 210 can be positioned over the punch 240 to receive the cup bottom 120 after it is punched from the aluminum material 10. In some embodiments, a shaft 211 can receive the cup bottom 120.

Figure 10:
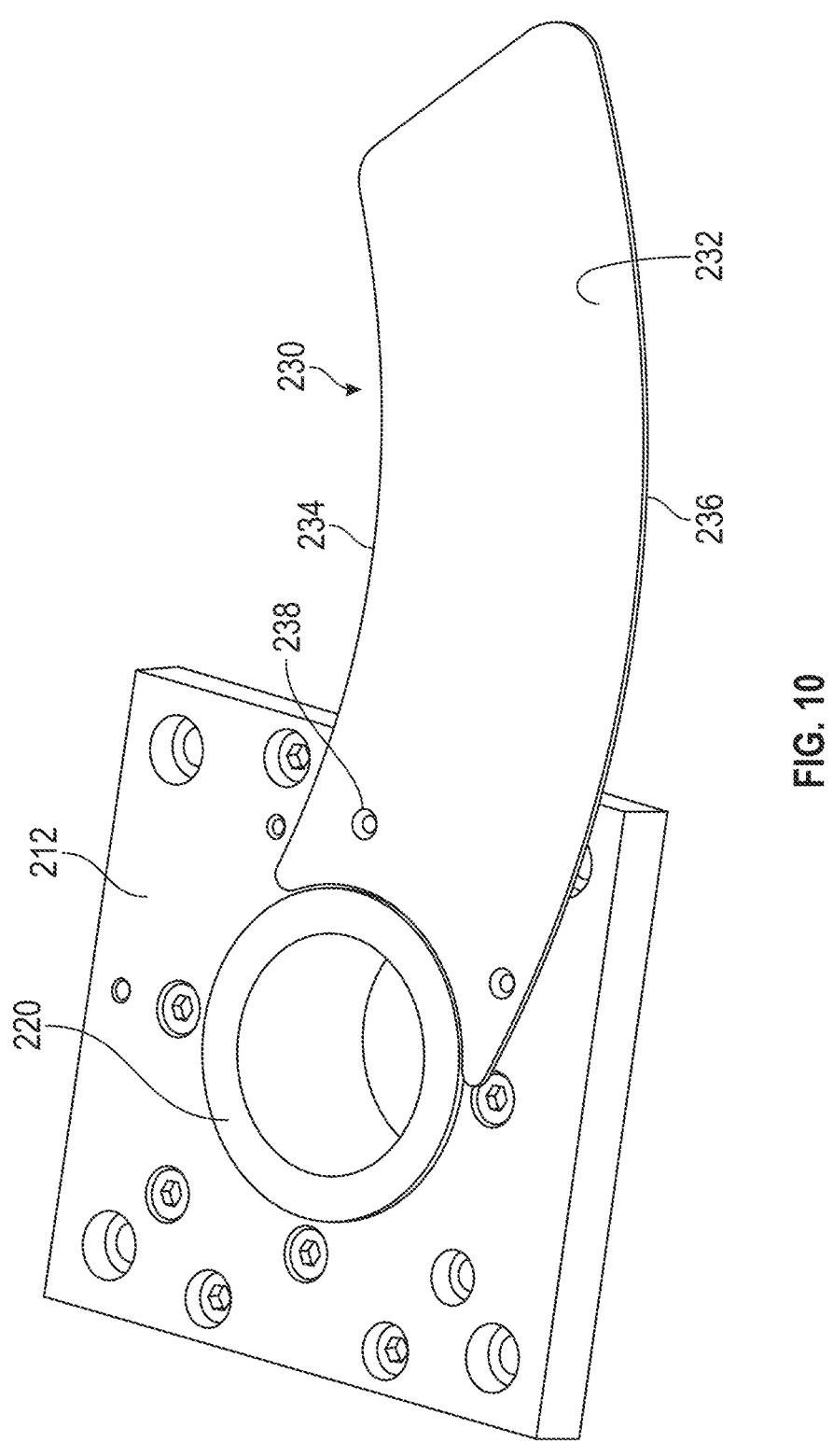
FIG. 10 is a perspective view of a die and support plate.
Figures 11, 12:
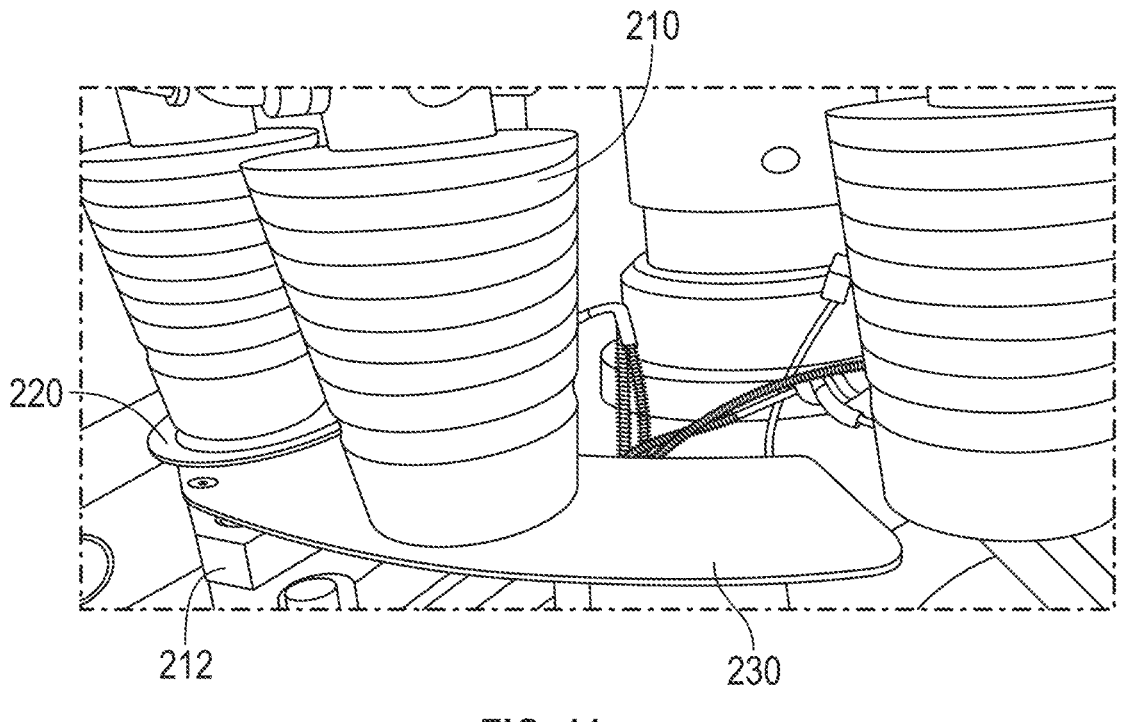
FIGS. 11 and 12 are perspective views of the die and support plate.

FIG. 10 is a perspective view of the upper die 212 and support plate 230. FIGS. 11 and 12 are perspective views of the upper die 212 and support plate 230. In the depicted example, the die and punch assembly 200 can include a support plate 230 to support the cup bottom 120 after formation. During operation, the support plate 230 can allow the cup bottom 120 to slide along the support surface 232 and remain captured within the cone 210 while the cup bottom 120 is transported by the cone 210. Advantageously, the support plate 230 can prevent the cup bottom 120 from getting folded, deformed, or otherwise damaged after formation.

In the depicted example, the support plate 230 can be curved in an arc to follow the path of the cup bottom 120 after it is formed. The support plate 230 can have an inner arc 234 and an outer arc 236 defining the shape of the support plate 230. As illustrated, the support plate 230 can be coupled to the upper die 212. In some embodiments, the support plate 230 can be affixed the upper die 212 with fasteners through attachment points 238.

FIG. 13 is a cross-sectional view of the cup side wall 102 and cup bottom 120 in accordance with some embodiments. FIG. 14 is a detail view of the cup side wall 102 and cup bottom 120 of FIG. 8. With reference to FIGS. 13 and 14, the cup bottom 120 is mated with the formed cup side wall 102. As illustrated, the cup bottom 120 is inserted through the bottom edge 110 of the formed cup side wall 102. After insertion, the bottom edge 110 of the cup side wall 102 is folded over the edge 124 of the cup bottom 120.

FIG. 15 is a cross-sectional view of a roller assembly 310 for manufacturing the cup 100 in accordance with some embodiments. FIG. 16 is a cross-sectional view of a roller 320 and cup 100 of FIG. 15. FIG. 17 is a side elevation view of the roller 320 of FIG. 16. With reference to FIGS. 15-17, the bottom edge 110 of the cup side wall 102 can be folded over the edge 124 of the cup bottom 120 by the roller assembly 310.

In the depicted example, the roller assembly 310 includes one or more rollers 320 that engage with the bottom edge 110 of the cup side wall 102 to fold the bottom edge 110. During operation, each roller 320 can rotate relative to the assembly body 316. In the depicted example, each roller 320 can be coupled to the assembly body 316 through an axle 321, allowing the roller 320 to rotate about the axle 321.

As illustrated, one or more assembly bodies 316 can be coupled to a common base plate 312. In some applications, the base plate 312 can be rotated by a shaft 314, rotating the base plate 312 about a central axis of the cup 100. Rotation of the base plate 312 about the shaft 314 can allow the rollers 320 to revolve about the central axis of the cup 100 or otherwise move along the circumference of the bottom edge 110 of the cup side wall 102.

In the depicted example, each roller 320 defines a folding groove 322 disposed between an outer disk 324 and an inner disk 326. As illustrated, the inner faces of the outer disk 324 and the inner disk 326 can be tapered toward the folding groove 322. In the depicted example, the folding groove 322, the outer disk 324, and the inner disk 326 can be dimensioned to facilitate the rolling, folding, or other manipulation of the bottom edge 110. In some embodiments, the folding groove 322 can have a groove radius $R_1$ that ranges between approximately 0.5 millimeters to approximately 2.5 millimeters (between approximately 0.020 inches to approximately 0.1 inches). Further, the folding groove 322 can have a diameter $D_1$ that ranges between approximately 7 millimeters to approximately 15 millimeters (between approximately 0.275 inches to approximately 0.6 inches).

As illustrated, in some embodiments, the outer face of the outer disk 324 can have a diameter $D_2$ that ranges between approximately 12 millimeters to approximately 20 millimeters (between approximately 0.47 inches to approximately 0.79 inches). The inner face of the outer disk 324 can have a taper between outer face diameter $D_2$ and the groove diameter $D_1$ with a taper angle $\alpha_1$ between approximately 10 degrees to approximately 30 degrees. Further, the inner face of the inner disk 326 can have a taper angle $\alpha_2$ between approximately 4 degrees to approximately 12 degrees.

Advantageously, the dimensions of the folding groove 322, the outer disk 324, and the inner disk 326 can avoid tearing, deformation, or other undesired effects that a workpiece may be susceptible to during the folding of the bottom edge 110 formed from an aluminum material.

FIG. 18 is a cross-sectional view of a roller assembly 350 for manufacturing the cup 100 in accordance with some embodiments. FIG. 19 is a cross-sectional view of a roller 360 and cup 100 of FIG. 18. FIG. 20 is a side elevation view of the roller 360 of FIG. 19. In some embodiments, the bottom edge 110 of the cup side wall 102 is folded over the edge 124 of the cup bottom 120 in two phases or steps. With reference to FIGS. 18-20, the bottom edge 110 of the cup side wall 102 is further folded or creased over the edge 124 of the cup bottom 120 by the roller assembly 310. Advantageously, folding or otherwise manipulating the bottom edge 110 of the cup 100 in multiple stages or phases can avoid tearing, deformation, or other undesired effects that a workpiece may be susceptible to during the folding of the bottom edge 110 formed from an aluminum material.

Similar to roller assembly 310, the roller assembly 350 includes one or more rollers 360 that engage with the folded portion of the bottom edge 110 of the cup side wall 102 to further fold or crease the bottom edge 110. During operation, each roller 360 can rotate relative to the assembly body 356. In the depicted example, each roller 360 can be coupled to the assembly body 356 through an axle 361, allowing the roller 360 to rotate about the axle 361.

As illustrated, one or more assembly bodies 356 can be coupled to a common base plate 352. In some applications, the base plate 352 can be rotated by a shaft 354, rotating the base plate 352 about a central axis of the cup 100. Rotation of the base plate 352 about the shaft 354 can allow the rollers 360 to revolve about the central axis of the cup 100 or otherwise move along the circumference of the folded bottom edge 110 of the cup side wall 102.

In the depicted example, each roller 360 defines a folding groove 362 disposed between an outer disk 364 and an inner disk 366. As illustrated, the inner faces of the outer disk 364 and the inner disk 366 can be tapered toward the folding groove 362. In the depicted example, the folding groove 362, the outer disk 364, and the inner disk 366 can be dimensioned to facilitate the rolling, folding, or other manipulation of the folded bottom edge 110. In some embodiments, the folding groove 362 can have a groove radius $R_2$ that ranges between approximately 0.5 millimeters to approximately 2.5 millimeters (between approximately 0.020 inches to approximately 0.1 inches). Further, the folding groove 362 can have a diameter $D_3$ that ranges between approximately 18 millimeters to approximately 23 millimeters (between approximately 0.70 inches to approximately 0.90 inches).

As illustrated, in some embodiments, the outer face of the outer disk 364 can have a diameter $D_4$ that ranges between approximately 23 millimeters to approximately 28 millimeters (between approximately 0.90 inches to approximately 1.10 inches). The inner face of the outer disk 364 can have a taper between outer face diameter $D_4$ and the groove diameter $D_3$ with a taper angle $\alpha_3$ between approximately 15 degrees to approximately 25 degrees. Further, the inner face of the inner disk 366 can have a taper angle $\alpha_4$ between approximately 8 degrees to approximately 15 degrees.

Advantageously, the dimensions of the folding groove 362, the outer disk 364, and the inner disk 366 can avoid tearing, deformation, or other undesired effects that a workpiece may be susceptible to during the further folding of the bottom edge 110 formed from an aluminum material.

During manufacturing, the bottom edge 110 of the cup side wall 102 and the edge 124 of the cup bottom 120 can be heated to adhere and seal the cup bottom 120 to the cup side wall 102. In some embodiments, a heating element or an ultrasonic welder is applied to bond the cup bottom 120 to the cup side wall 102. In some applications, the seal between the cup bottom 120 to the cup side wall 102 is watertight.

FIG. 21 is a cross-sectional view of a welding assembly 370 for manufacturing the cup 100 in accordance with some embodiments. FIG. 22 is a detail view of the welding assembly 370 of FIG. 21. With reference to FIGS. 20 and 21, the bottom edge 110 of the cup side wall 102 and the edge 124 of the cup bottom 120 can be heated by the welding assembly 370. In the depicted example, the welding assembly 370 includes one or more welding elements 380 that engage with the bottom edge 110 of the cup side wall 102 to heat and seal the cup bottom 120 to the cup side wall 102. During operation, the welding elements 380 can move radially outward to engage with the bottom edge 110 of the cup 100. As illustrated, the welding elements 380 can move radially outward to capture, press, or otherwise engage the bottom edge 110 between the welding element 380 and outer ring 386.

In some embodiments, the welding elements 380 are coupled to a common base plate 372. The base plate 372 can be rotated by a shaft 374, rotating the base plate 372 about a central axis of the cup 100. Rotation of the base plate 372 about the shaft 374 can allow the welding elements 380 to revolve about the central axis of the cup 100 or otherwise move along the circumference of the bottom edge 110 of the cup side wall 102.

As illustrated, the welding element 380 includes a lower portion 382 to axially support the bottom edge 110 and an upper portion 384 to radially engage the bottom edge 110. In some embodiments, the upper portion 384 can be tapered or angled to match the frustoconical shape of the cup 100. In some applications the mating surface of the outer ring 386 can have a mating or complimentary taper or angle.

In the depicted example, features of the welding element 380 and/or the outer ring 386 can be dimensioned to facilitate the folding, heating, welding, or sealing of the bottom edge 110 with the cup bottom 120. In some embodiments, the outer ring 386 can have a support height $H_1$ that ranges between approximately 4 millimeters to approximately 10 millimeters (between approximately 0.34 inches to approximately 1.15 inches). The upper portion 384 and/or the outer ring 386 can have a common taper with a taper angle $\alpha_5$ between approximately 4 degrees to approximately 10 degrees. Advantageously, the dimensions of the welding element 380 and/or the outer ring 386 can avoid tearing, deformation, or other undesired effects that a workpiece may be susceptible to during the folding or sealing of the bottom edge 110 and cup bottom 120 formed from an aluminum material.

FIG. 23 is a cross-sectional view of the cup side wall 102 and cup bottom 120 in accordance with some embodiments. FIG. 24 is a detail view of the cup side wall 102 of FIG. 23. With reference to FIGS. 23 and 24, the upper edge 108 of the cup side wall 102 can be rolled downward to form a rounded top lip 109. The rounded top lip 109 can provide rigidity and structure for the cup side wall 102 and enhance comfort during use. In the depicted example, the top lip 109 can be shaped or otherwise configured to be compatible with lids configured for use with certain conventional paper or plastic cups. In some applications, the top lip 109 can provide a leak-resistant seal with a lid.

FIG. 25 is a roller assembly 410 for manufacturing the cup 100 in accordance with some embodiments. FIG. 26 is a detail view of the roller 420 and cup 100 of FIG. 25. FIG.

27 is a detail view of the roller 420 of FIG. 26. With reference to FIGS. 25-27, the upper edge 108 of the cup side wall 102 can be rolled downward by the roller assembly 410.

In the depicted example, the roller assembly 410 includes one or more rollers 320 that engage with the upper edge 108 of the cup side wall 102 to roll the upper edge 108 downward to form the top lip 109. During operation, each roller 420 can rotate relative to the assembly body 416. In the depicted example, each roller 420 can be coupled to the assembly body 416 through an axle 421, allowing the roller 420 to rotate about the axle 421.

As illustrated, one or more assembly bodies 416 can be coupled to a common base plate 412. In some applications, the base plate 412 can be rotated by a shaft 414, rotating the base plate 412 about a central axis of the cup 100. Rotation of the base plate 412 about the shaft 414 can allow the rollers 420 to revolve about the central axis of the cup 100 or otherwise move along the circumference of the upper edge 108 of the cup side wall 102. As illustrated, the rollers 420 can be disposed at an angle to match the angle of the cup side wall 102.

In the depicted example, each roller 420 defines a rolling groove 422 disposed between an outer disk 424 and an inner disk 426. As illustrated, the inner faces of the outer disk 424 and the inner disk 426 can be tapered toward the rolling groove 422. In the depicted example, the rolling groove 422, the outer disk 424, and the inner disk 426 can be dimensioned to facilitate the rolling or other manipulation of the upper edge 108. In some embodiments, the rolling groove 322 can have a groove radius $R_3$ that ranges between approximately 0.5 millimeters to approximately 4 millimeters (between approximately 0.020 inches to approximately 0.16 inches). Optionally, the rolling groove 322 can have a groove radius $R_3$ that ranges between approximately 1.5 millimeters to approximately 3 millimeters (between approximately 0.06 inches to approximately 0.12 inches). Further, the rolling groove 422 can have a diameter Ds that ranges between approximately 10 millimeters to approximately 17 millimeters (between approximately 0.39 inches to approximately 0.67 inches).

As illustrated, in some embodiments, the outer face of the outer disk 424 can have a diameter $D_6$ that ranges between approximately 14 millimeters to approximately 20 millimeters (between approximately 0.55 inches to approximately 0.78 inches). Further, the inner face of the inner disk 426 can have a taper angle $\alpha_6$ between approximately 10 degrees to approximately 35 degrees. Advantageously, the dimensions of the rolling groove 422, the outer disk 424, and the inner disk 426 can avoid tearing, deformation, or other undesired effects that a workpiece may be susceptible to during the rolling of the upper edge 108 formed from an aluminum material.

FIG. 28 is a perspective view of a rolling assembly 500 for manufacturing a cup 100 in accordance with some embodiments. FIG. 29 is a cross-sectional view of the rolling assembly 500 of FIG. 28. With reference to FIGS. 28 and 29, the upper edge 108 of the cup side wall 102 is further rolled into the top lip 109 by the rolling assembly 500. Advantageously, rolling or otherwise manipulating the upper edge 108 of the cup 100 in multiple stages or phases can avoid tearing, deformation, or other undesired effects that a workpiece may be susceptible to during the rolling of the upper edge 108 formed from an aluminum material.

In the depicted example, the rolling assembly 500 includes an upper die 510 and a lower die 520 to roll the upper edge 108 into the top lip 109. As described herein, the upper die 510 is moved into engagement with the lower die

520 to roll the upper edge 108 of the cup 100. In some embodiments, the rolling assembly 500 includes a positioning element 514 to locate, position, and stabilize the cup 100 during the rolling process. As illustrated, the positioning element 514 can extend into the cup 100. The positioning element 514 can be actuated by a shaft 516. The positioning element 514 can include a biasing member or spring 518 to provide a desired positioning force on the cup 100. In some embodiments, the rolling assembly 500 includes a receiving cone 530 to further position the cup 100. In the depicted example, the receiving cone 530 locates and supports the side wall 102 of the cup 102 as the upper edge 108 is rolled. As illustrated the cone body 532 can be angled to provide or match the frustoconical angle of the side wall 102. The receiving cone 530 can be attached to a working surface or other attachment point via flange 534.

FIG. 30 is a detail view of the rolling assembly 500 and cup 100 of FIG. 29. As illustrated, features of various elements of the rolling assembly 500 can cooperatively roll the upper edge 108 of the cup 100. In the depicted example, the upper edge 108 and the top lip 109 of the cup 100 is received by a groove 522 of the lower die 520. In some embodiments, the groove 522 is shaped to support and promote the rolling of the top lip 109. Similarly, the upper die 510 includes a mating groove 512 to engage with the upper edge 108 and promote the rolling of the top lip 109. In some embodiments, the upper edge 108 of the cup side wall 102 is supported by the cone body 532 of the receiving cone 530.

FIG. 31 is a cross-sectional view of an upper die 510 of the rolling assembly 500 of FIG. 29. With reference to FIGS. 28-31 and as described herein, the upper die 510 can engage with the upper edge 108 of the cup 100 to roll the top lip 109. In the depicted example, the upper die 510 includes a groove 512 disposed between an inner rim 511 and an outer rim 513. In the depicted example, the groove 512, the inner rim 511, and the outer rim 513 can be dimensioned to facilitate the rolling or other manipulation of the upper edge 108. In some embodiments, the groove 512 can have a groove radius $R_7$ that ranges between approximately 0.5 millimeters to approximately 2.5 millimeters (between approximately 0.020 inches to approximately 0.1 inches). In some embodiments, as the groove 512 transitions toward the inner rim 511, the transition radius $R_8$ can range between approximately 5 millimeters to approximately 15 millimeters (between approximately 0.197 inches to approximately 0.6 inches). In some embodiments, the depth $H_3$ of the groove 512 relative to the outer rim 513 can range between approximately 0.55 millimeters to approximately 2.5 millimeters (between approximately 0.020 inches to approximately 0.1 inches). Further, the height of the inner rim 511 relative to the outer rim 513 $H_4$ (i.e. the depth of the groove 512 relative to the inner rim 511) can range between approximately 0.55 millimeters to approximately 2.5 millimeters (between approximately 0.020 inches to approximately 0.1 inches). Advantageously, the dimensions of the groove 512, the inner rim 511, and the outer rim 513 can avoid tearing, deformation, or other undesired effects that a workpiece may be susceptible to during the rolling of the upper edge 108 and formation of the top lip 109 formed from an aluminum material.

FIG. 32 is a perspective view of a lower die 520 of the rolling assembly 500 of FIG. 29. FIG. 33 is a detail view of the lower die 520 of FIG. 32.

With reference to FIGS. 28-30, 32, and 33 and as described herein, the lower die 520 can cooperatively engage with the upper edge 108 of the cup 100 to roll the top lip 109. In the depicted example, the lower die 520 includes a groove 522 disposed on an edge of lip 526. As illustrated, the lip 526 can extend from the flange 524. The flange 524 can allow the lower die 520 to be mounted relative to the rolling assembly 500. In the depicted example, the groove 522 and the lip 526 can be dimensioned to facilitate the rolling or other manipulation of the upper edge 108. In some embodiments, the groove 522 can have a groove radius $R_9$ that ranges between approximately 0.5 millimeters to approximately 2.5 millimeters (between approximately 0.020 inches to approximately 0.1 inches). In some embodiments, the depth $H_4$ of the groove 522 relative to the lip 526 can range between approximately 0. 5 millimeters to approximately 2.5 millimeters (between approximately 0.020 inches to approximately 0.1 inches). Advantageously, the dimensions of the groove 522 and the lip 526 can avoid tearing, deformation, or other undesired effects that a workpiece may be susceptible to during the rolling of the upper edge 108 and formation of the top lip 109 formed from an aluminum material.

FIG. 34 is a perspective view of a receiving cone 530 of the rolling assembly 500 of FIG. 29. FIG. 35 is a cross-sectional view of the receiving cone 530 of FIG. 34. With reference to FIGS. 28-30, 34, and 35 and as described herein, the receiving cone 530 can support the cup 100 while the top lip 109 is rolled. In the depicted example, the receiving cone 530 includes a cone body 532 to support the cup side wall 102 and the upper edge 108 while the top lip 109 is rolled. As illustrated, a flange 534 can extend around the cone body 532. The flange 534 can allow the cone body 532 to be mounted relative to the rolling assembly 500. In the depicted example, the cone body 532 can be dimensioned to support the cup 100, form the cup side wall 102 into a desired shape, and/or facilitate the rolling or other manipulation of the upper edge 108.

In some embodiments, the cone body 532 can have a depth or height $H_4$ that ranges between approximately 105 millimeters to approximately 115 millimeters (between approximately 4.14 inches to approximately 4.53 inches). In some embodiments, the diameter of the upper opening $D_8$ of the cone body 532 can range between approximately 85 millimeters to approximately 95 millimeters (between approximately 3.35 inches to approximately 3.74 inches). In some embodiments, the diameter of the lower opening $D_7$ of the cone body 532 can range between approximately 60 millimeters to approximately 65 millimeters (between approximately 2.36 inches to approximately 2.56 inches). In the depicted example, the inner wall of the cone body 532 can have a taper between the upper opening and the lower opening with a taper angle $\alpha_7$ between approximately 3 degrees to approximately 12 degrees. Advantageously, the dimensions of cone body 532 can avoid tearing, deformation, or other undesired effects that a workpiece may be susceptible to during the rolling of the upper edge 108 and formation of the top lip 109 formed from an aluminum material. Optionally, in some embodiments, the cup side wall 102 and/or the cup bottom 120 can be embossed with manufacturing information, specifications, and/or logos or branding. Further, in some embodiments, portions of the aluminum cup 100, such as the cup side wall 102 can be printed with designs, logos, and/or branding. In some embodiments, the entirety of the aluminum cup 100 (i.e. from foot to lip) can be printed. Advantageously, since the cup side wall 102 is free from steps or undulations, a printed or embossed design can be clearly depicted or viewed.

It will also be understood that, although the terms first, second, etc. are, in some instances, used herein to describe various elements, these elements should not be limited by these terms. These terms are only used to distinguish one element from another. For example, a first valve could be termed a second valve, and, similarly, a second valve could be termed a first valve, without departing from the scope of the various described embodiments. The first valve and the second valve are both valves, but they are not the same valve unless explicitly stated.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An aluminum cup comprising:
a common aluminum material comprising:
an aluminum foil layer, comprising a common foil thickness of between 80 to 180 microns;
a first polymer layer disposed on a first surface of the aluminum foil layer; and
a second polymer layer disposed on a second surface of the aluminum foil layer opposite the first surface;
a cup side wall formed from the common aluminum material, the cup side wall comprising:
a first perpendicular edge; and
a second perpendicular edge,
wherein the first perpendicular edge of the cup side wall is bonded to the second perpendicular edge of the cup side wall to bond the first polymer layer to the second polymer layer, to have a frustoconical shape; and
a cup bottom formed from the common aluminum material, wherein the cup side wall is coupled to the cup bottom and the cup side wall and the cup bottom have the same common foil thickness.

2. The aluminum cup of claim 1, wherein the frustoconical shape comprises a constant taper.

3. The aluminum cup of claim 1, wherein the first polymer layer of the cup side wall is disposed on a portion of the first surface adjacent to the first perpendicular edge of the cup side wall.

4. The aluminum cup of claim 1, wherein the second polymer layer of the cup side wall is disposed on a portion of the second surface adjacent to the second perpendicular edge of the cup side wall.

5. The aluminum cup of claim 1, further comprising a rolled lip at an upper edge of the cup side wall.

6. The aluminum cup of claim 1,
wherein the cup side wall is bonded to the cup bottom to bond the first polymer layer of the cup side wall to the first polymer layer of the cup bottom.

7. The aluminum cup of claim 1, the first polymer layer of the common aluminum material comprising a first polymer thickness of between 5 to 60 microns, and the second polymer layer of the common aluminum material comprising a second polymer thickness of between 5 to 60 microns.

8. The aluminum cup of claim 1, wherein the frustoconical shape has a taper angle between about 3 degrees and about 12 degrees.

9. The aluminum cup of claim 8, wherein the taper angle of the frustoconical shape minimizes tearing of the cup side wall.

10. An aluminum cup comprising:
a common aluminum material comprising:
an aluminum foil layer, comprising a common foil thickness of between 80 to 180 microns; and
a first polymer layer disposed on a first surface of the aluminum foil layer;
a cup side wall formed from the common aluminum material, the cup side wall; and
a cup bottom formed from the common aluminum material,
wherein the cup side wall is bonded to the cup bottom to bond the first polymer layer of the cup side wall to the first polymer layer of the cup bottom, the cup side wall forms a frustoconical shape, and the cup side wall and the cup bottom have the same common foil thickness.

11. The aluminum cup of claim 10, wherein the cup bottom has a circular profile.

12. The aluminum cup of claim 10, wherein the common aluminum material further comprises a second polymer layer disposed on a second surface of the aluminum foil layer opposite the first surface.

13. The aluminum cup of claim 12, the first polymer layer of the common aluminum material comprising a first polymer bottom thickness of between 5 to 60 microns, and the second polymer layer of the common aluminum material comprising a second polymer bottom thickness of between 5 to 60 microns.

14. The aluminum cup of claim 10, wherein a first perpendicular edge of the cup side wall is bonded to a second perpendicular edge of the cup side wall.

15. The aluminum cup of claim 10, further comprising a rolled lip at an upper edge of the cup side wall.

16. The aluminum cup of claim 10, wherein the frustoconical shape has a taper angle between about 3 degrees and about 12 degrees.

17. The aluminum cup of claim 16, wherein the taper angle of the frustoconical shape minimizes tearing of the cup side wall.

18. An aluminum cup comprising:

a common aluminum material comprising:

an aluminum foil layer, comprising a common foil thickness of between 80 to 180 microns;

a first polymer layer disposed on a first surface of the aluminum foil layer; and a second polymer layer disposed on a second surface of the aluminum foil layer opposite the first surface;

a cup side wall formed from the common aluminum material, wherein the cup side wall forms a frustoconical shape; and a cup bottom formed from the common aluminum material, wherein the cup side wall is coupled to the cup bottom and the cup side wall and the cup bottom have the same common foil thickness.

19. The aluminum cup of claim 18, wherein the first polymer layer of the cup side wall is disposed in an inner portion of the frustoconical shape.

20. The aluminum cup of claim 18, wherein the second polymer layer of the cup side wall is disposed on an outer portion of the frustoconical shape.

21. The aluminum cup of claim 18, further comprising a rolled lip at an upper edge of the cup side wall.

22. The aluminum cup of claim 18, wherein the cup side wall is bonded to the cup bottom to bond the first polymer layer of the cup side wall to the first polymer layer of the cup bottom.

23. The aluminum cup of claim 18, the common aluminum material comprising the first polymer layer comprising a first polymer thickness of between 5 to 60 microns, and the second polymer layer comprising a second polymer thickness of between 5 to 60 microns.

24. The aluminum cup of claim 18, wherein the frustoconical shape has a taper angle between about 3 degrees and about 12 degrees.

25. The aluminum cup of claim 24, wherein the taper angle of the frustoconical shape minimizes tearing of the cup side wall.

26. An aluminum cup comprising:

a common aluminum material comprising:

an aluminum foil layer, comprising a common foil thickness of between 80 to 180 microns;

a first polymer layer disposed on a first surface of the aluminum foil layer; and a second polymer layer disposed on a second surface of the aluminum foil layer opposite the first surface;

a cup side wall formed from the common aluminum material, the cup side wall comprising:

a first perpendicular edge; and a second perpendicular edge, wherein the first perpendicular edge of the cup side wall is bonded to the second perpendicular edge of the cup side wall to bond the first polymer layer to the second polymer layer to form the cup side wall in a frustoconical shape having a taper angle between about 3 degrees and about 12 degrees;

a rolled lip at an upper edge of the cup side wall; and a cup bottom formed from the common aluminum material, wherein the cup side wall is bonded to the cup bottom to bond the first polymer layer of the cup side wall to the first polymer layer of the cup bottom, and the cup side wall and the cup bottom have the same common foil thickness.

* * * * *